United States Patent
Zhang et al.

(10) Patent No.: US 12,477,544 B2
(45) Date of Patent: *Nov. 18, 2025

(54) BEAM ADJUSTMENT/CANCELLATION RULES FOR NON-COMPATIBLE UL/DL BEAMS

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/520,479

(22) Filed: Nov. 27, 2023

(65) Prior Publication Data
US 2024/0098745 A1    Mar. 21, 2024

Related U.S. Application Data

(63) Continuation of application No. 17/112,934, filed on Dec. 4, 2020, now Pat. No. 11,895,652.

(51) Int. Cl.
*H04W 72/20* (2023.01)
*H04B 7/06* (2006.01)
*H04L 5/16* (2006.01)
*H04W 72/044* (2023.01)

(52) U.S. Cl.
CPC .......... *H04W 72/20* (2023.01); *H04B 7/0696* (2023.05); *H04L 5/16* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 9,577,813 B2 * | 2/2017 | Karjalainen | ............ H04W 8/22 |
| 2009/0092066 A1 | 4/2009 | Chindapol et al. | |
| 2010/0303004 A1 | 12/2010 | Mueck et al. | |
| 2011/0243040 A1 | 10/2011 | Khan et al. | |

(Continued)

OTHER PUBLICATIONS

International Search Report and Written Opinion—PCT/US2021/061674—ISA/EPO—Mar. 25, 2022.

(Continued)

*Primary Examiner* — Nicholas Sloms
(74) *Attorney, Agent, or Firm* — Procopio, Cory, Hargreaves & Savitch LLP

(57) ABSTRACT

A wireless device, such as a user equipment (UE), may receive first scheduling information with first resources for periodic transmissions with a first beam based on a half-duplex mode. The wireless device may receive second scheduling information for second resources associated with a second beam that is incompatible with the first beam for full duplex communication including downlink reception and uplink transmission that overlaps in time. The wireless device may adjust communication in response to the first beam being incompatible with the second beam for the full duplex communication.

30 Claims, 15 Drawing Sheets

(56) References Cited

U.S. PATENT DOCUMENTS

| | | |
|---|---|---|
| 2013/0051288 A1 | 2/2013 | Yamada et al. |
| 2013/0083740 A1 | 4/2013 | Eriksson et al. |
| 2016/0337107 A1 | 11/2016 | Tabet et al. |
| 2016/0344532 A1 | 11/2016 | Bhat et al. |
| 2017/0054544 A1 | 2/2017 | Kazmi et al. |
| 2017/0353212 A1 | 12/2017 | Bharadia et al. |
| 2017/0359161 A1 | 12/2017 | Montojo et al. |
| 2018/0199328 A1* | 7/2018 | Sang ............... H04L 5/001 |
| 2018/0234230 A1 | 8/2018 | Kalhan |
| 2018/0351630 A1 | 12/2018 | Nilsson et al. |
| 2019/0021084 A1 | 1/2019 | Stirling-Gallacher et al. |
| 2019/0074857 A1 | 3/2019 | Kolanski et al. |
| 2019/0098520 A1* | 3/2019 | Kim ............... H04W 76/27 |
| 2019/0124490 A1 | 4/2019 | Wu et al. |
| 2019/0140811 A1* | 5/2019 | Abedini ............ H04B 7/04 |
| 2019/0357149 A1 | 11/2019 | Zhang |
| 2019/0364561 A1* | 11/2019 | Xiong ............ H04W 76/27 |
| 2020/0214018 A1 | 7/2020 | Venugopal et al. |
| 2021/0143895 A1 | 5/2021 | Kim |
| 2022/0182992 A1 | 6/2022 | Kim |
| 2022/0183041 A1 | 6/2022 | Zhang et al. |
| 2022/0255611 A1* | 8/2022 | Chavva ............ H04B 7/0695 |

OTHER PUBLICATIONS

Lenovo, et al., "Discussion of Multi-Beam Operation", 3GPP Draft, 3GPP TSG RAN WG1 Meeting #97, R1-1908721_Multi_Beam_Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, Aug. 17, 2019 (Aug. 17, 2019), XP051765329, 9 Pages, Chapter 2.4, pp. 7, 8, Section 2.2, p. 5-p. 6.

Nokia, et al., "Enhancements on Multi-Beam Operation", 3GPP TSG RAN WG1 Meeting #AH-1901, R1-1900692, 3GPP, Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019, XP051593539, 20190111, 17 Pages, section 2.1.1, 2.1.2, observation 1, p. 2, section 2.2.2, p. 5, section 2.2.3, p. 5-6, section 2.2.4, p. 6, section 2.5, p. 10-11.

* cited by examiner

| FIRST SCHEDULING INFORMATION (ASSOCIATED W/ FIRST BEAM) | SECOND SCHEDULING INFORMATION (ASSOCIATED W/ SECOND BEAM) |
|---|---|
| uplink resources for uplink transmissions with an uplink beam | downlink resources for reception of a downlink transmission with a downlink beam |
| downlink resources for reception of downlink transmissions with a downlink beam | uplink resources for an uplink transmission with an uplink beam |

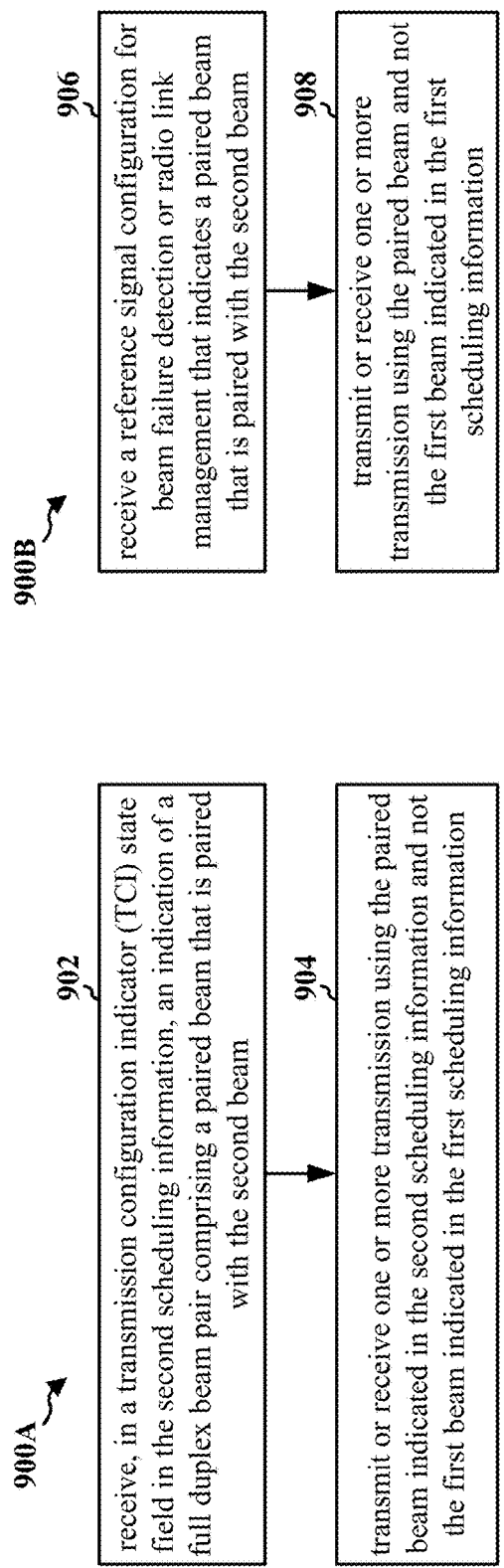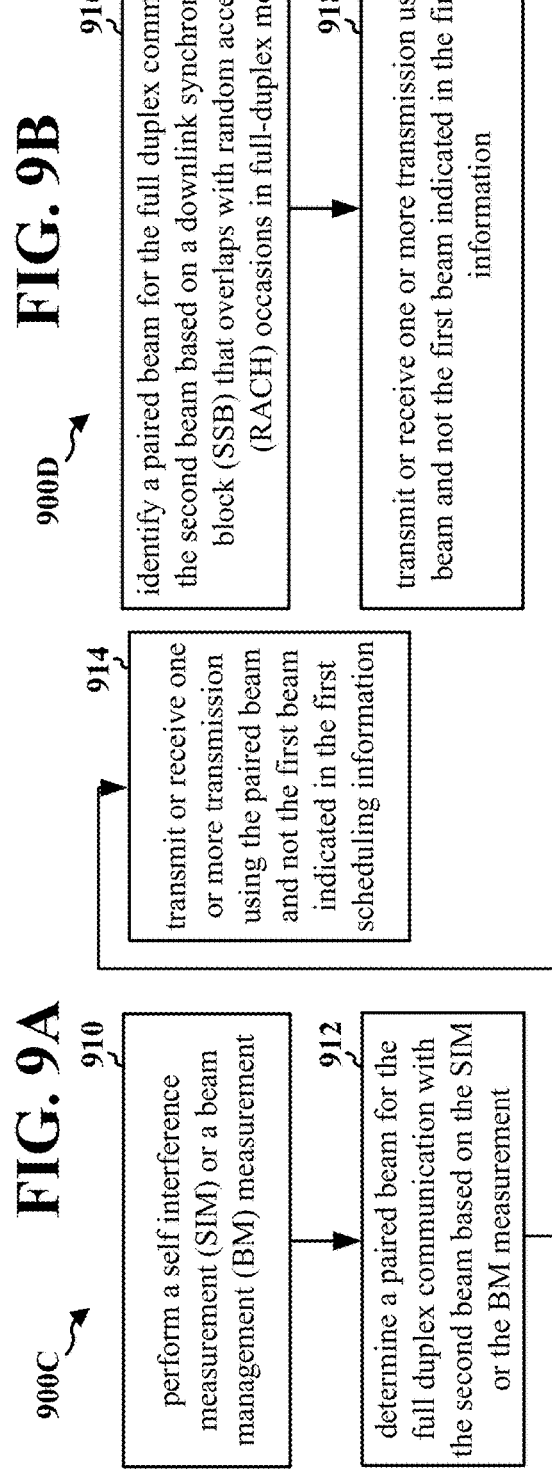
FIG. 9A
FIG. 9B
FIG. 9C
FIG. 9D

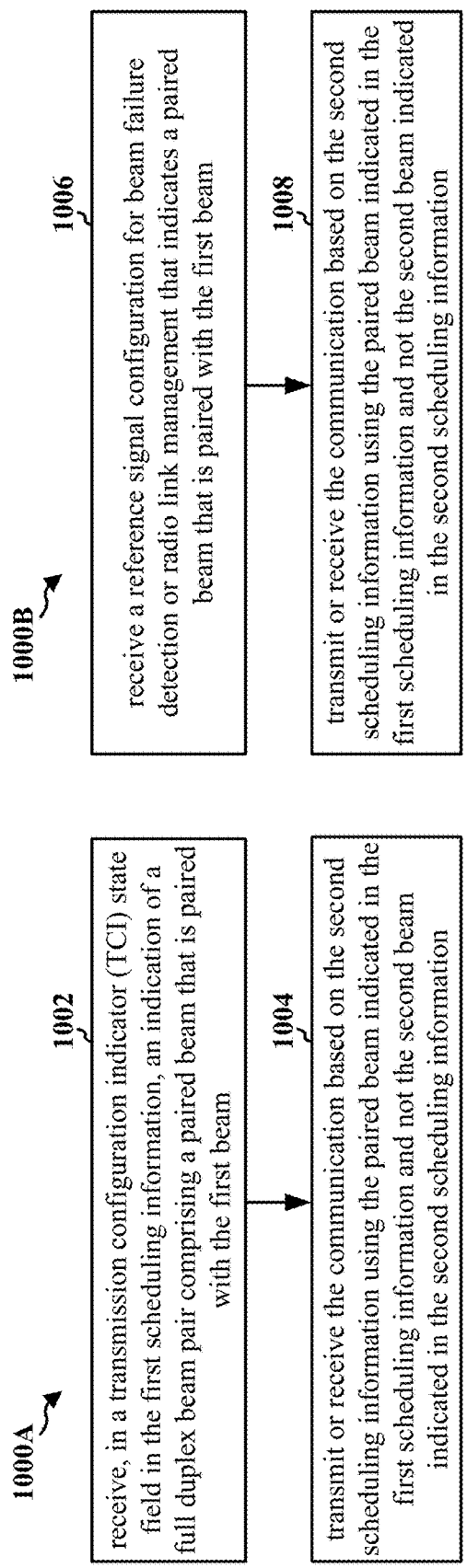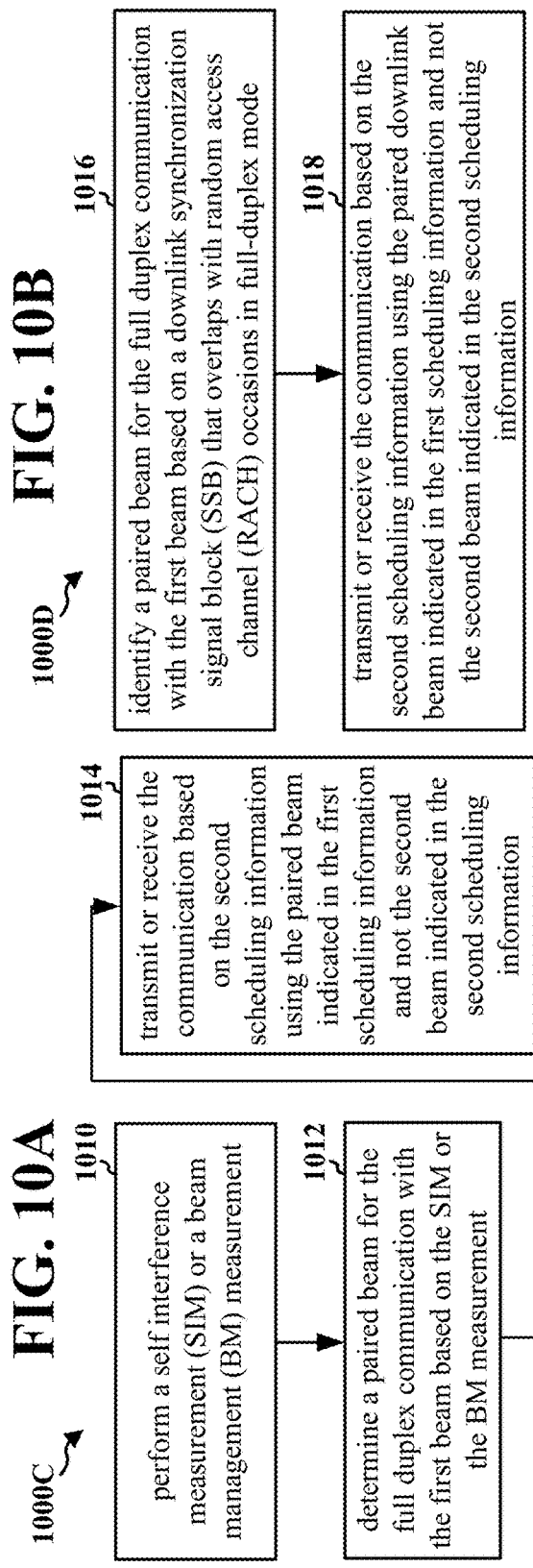

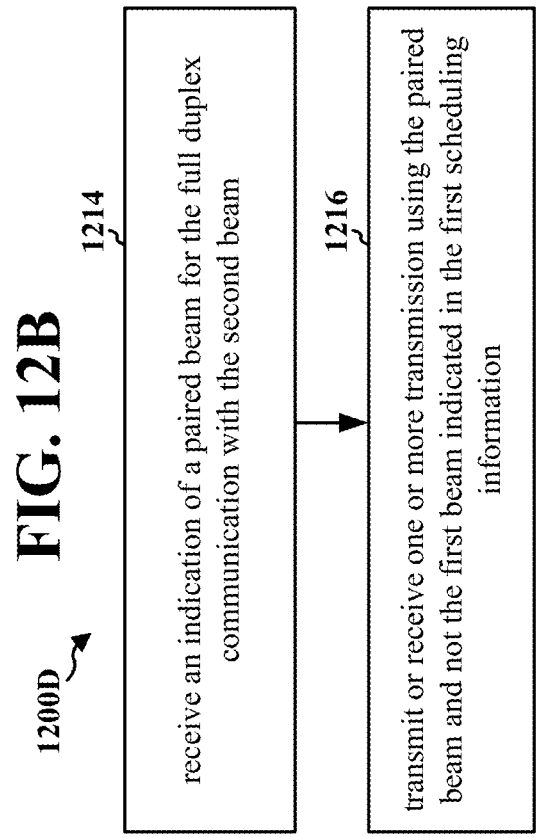
FIG. 12B
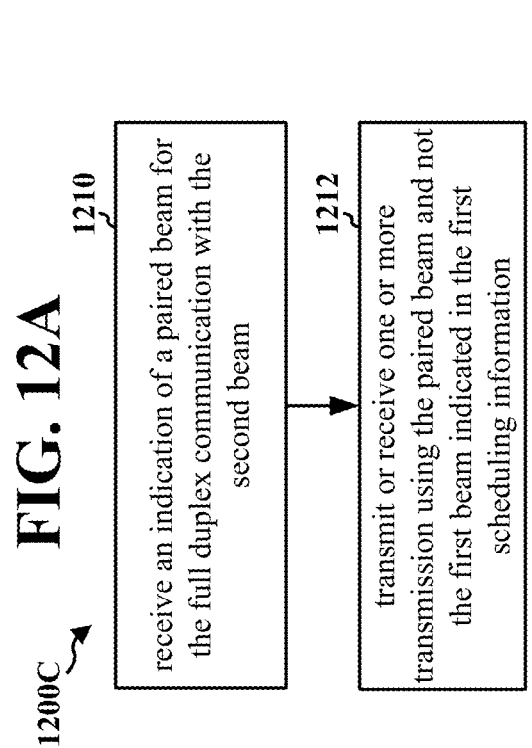
FIG. 12D
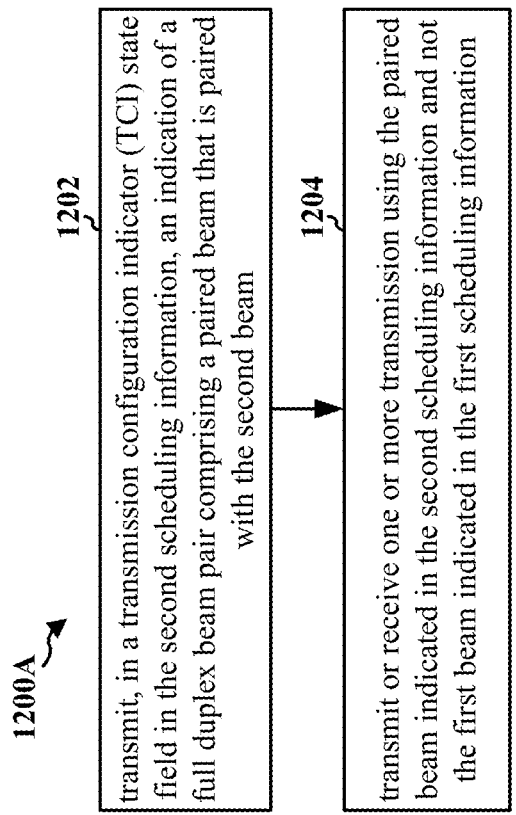
FIG. 12A
FIG. 12C

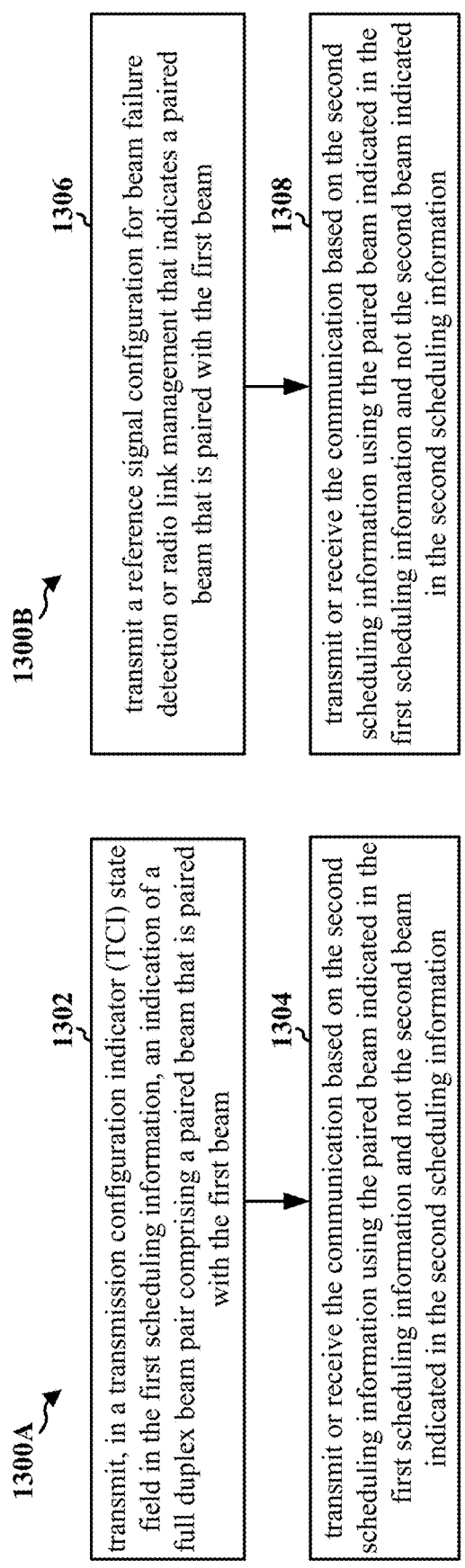
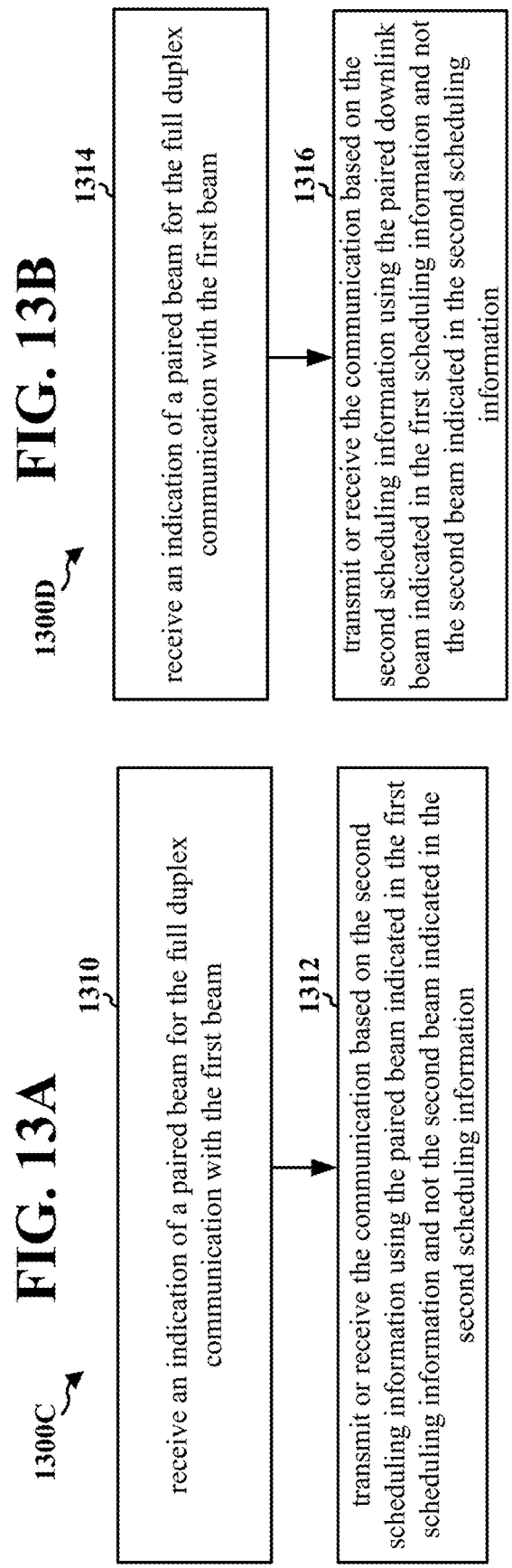
FIG. 13A
FIG. 13B
FIG. 13C
FIG. 13D

BEAM ADJUSTMENT/CANCELLATION RULES FOR NON-COMPATIBLE UL/DL BEAMS

CROSS REFERENCE TO RELATED APPLICATION(S)

This application is a Continuation of U.S. Non-provisional application Ser. No. 17/112,934, entitled "BEAM ADJUSTMENT/CANCELLATION RULES FOR NON-COMPATIBLE UL/DL BEAMS" and filed on Dec. 4, 2020, which is expressly incorporated by reference herein in its entirety.

BACKGROUND

Technical Field

The present disclosure relates generally to communication systems, and more particularly, to communication in a full-duplex mode in a wireless communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may receive first scheduling information with first resources associated with a first beam based on a half-duplex mode. The apparatus may receive second scheduling information for second resources associated with a second beam that is incompatible with the first beam for full duplex communication including downlink reception and uplink transmission that overlap in time. Furthermore, the apparatus may adjust communication in response to the first beam being incompatible with the second beam for the full duplex communication.

In another aspect of the disclosure, a method, a computer-readable medium, and an apparatus at a base station are provided. The apparatus may transmit first scheduling information with first resources associated with a first beam based on a half-duplex mode. The apparatus may transmit second scheduling information for second resources associated with a second beam that is incompatible with the first beam for full duplex communication including downlink transmission and uplink reception that overlap in time. Furthermore, the apparatus may adjust communication in response to the first beam being incompatible with the second beam for the full duplex communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a diagram illustrating the first scheduling information and the second scheduling information.

FIGS. 9A-D are flowcharts of methods of adjusting the first beam according to different aspects.

FIGS. 10A-D are flowcharts of methods of adjusting the second beam according to different aspects.

FIGS. 12A-D are flowcharts of methods of adjusting the first beam according to different aspects.

FIGS. 13A-D are flowcharts of methods of adjusting the second beam according to different aspects.

DETAILED DESCRIPTION

Figure 1:
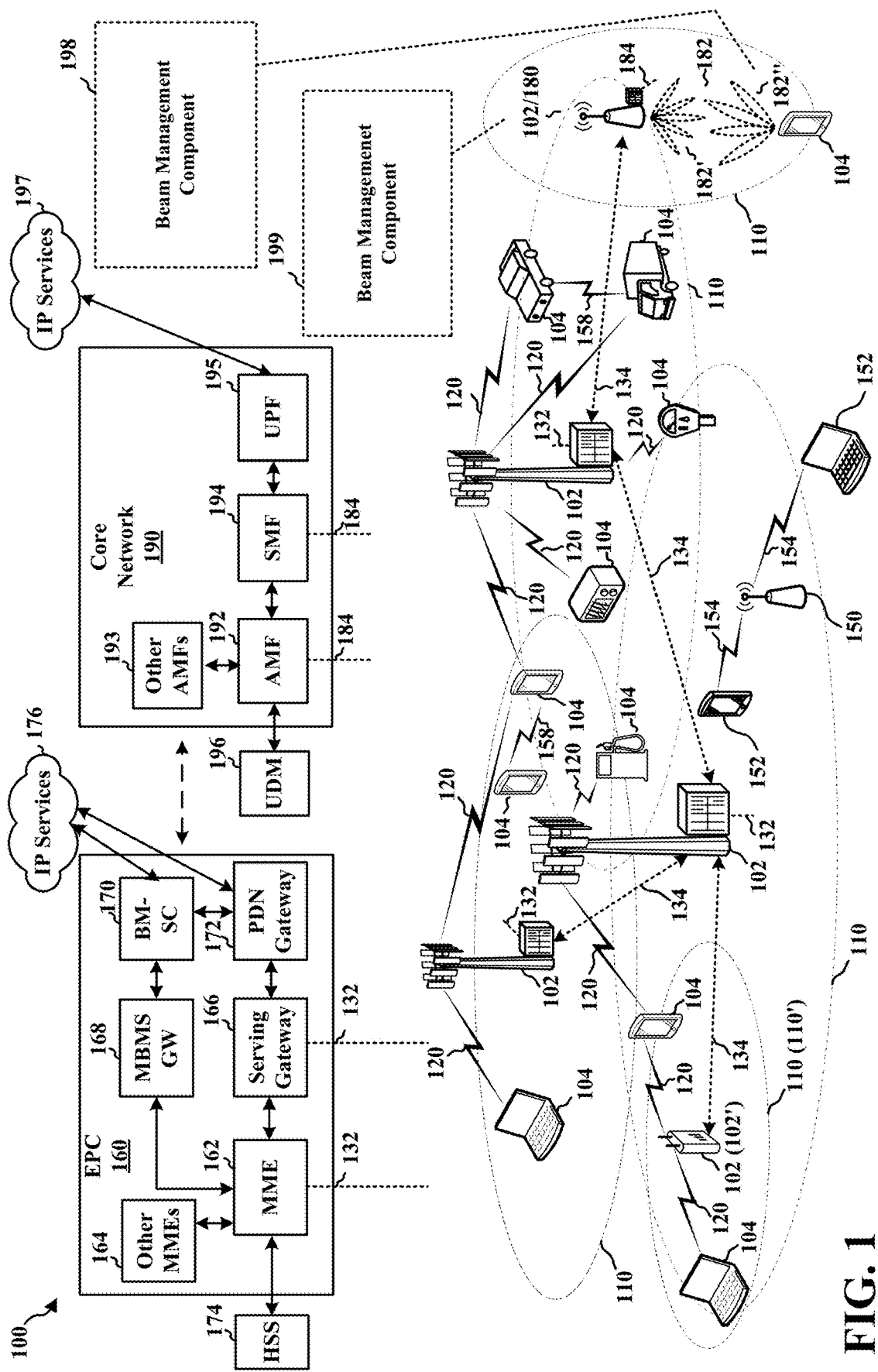
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A user equipment (UE) and/or a base station may communicate in a full duplex mode in which uplink communication and downlink communication is exchanged in a same frequency band, in partially overlapped frequency bands, or in separate frequency bands at overlapping times. The UE and the base station may exchange communication using one or more directional beams. The UE may perform ongoing uplink or downlink transmissions in a half-duplex mode based on first scheduling information received from the base station. At an overlapping time, the base station may schedule additional transmission in the opposite direction with second scheduling information. The scheduled beams for the transmissions in the two directions, i.e., uplink and downlink, may not be compatible with each other for full duplex communication due to e.g., the inability to cancel or sufficiently mitigate the associated self-interference between concurrent transmission and reception on the two beams. The first beam may be selected based on a first metric for half-duplex communication (e.g., a reference signal received power (RSRP)), and the second beam may be selected based on a second metric for full-duplex communication (e.g., a signal to interference and noise ratio (SINR)). Thus, the second metric may consider self-interference that is not considered in the first metric. For example, a half-duplex mode beam may be based on the best RSRP beam (e.g. downlink beam 1) among a set of candidate beams. In contrast, the full-duplex mode beam pair may be based on a best SINR beam pair that has the highest signal strength and for which the transmission (Tx) beam creates a small self-interference to its paired reception (Rx) beam (e.g. a beam pair including downlink beam 3 and uplink beam 5). If the first transmission is scheduled for half-duplex downlink beam 1 at time that overlaps the second transmission that is scheduled for the UL beam 5 from the full-duplex beam pair, beam 5 may create self-interference to the downlink reception on beam 1. Thus, beam 5 may be considered incompatible with beam 1 for full-duplex communication that includes transmission and reception that overlaps in time. Aspects described herein relate to methods for handling the incompatible uplink and downlink beams.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a beam management component 198 that may be configured to receive first scheduling information with first resources for transmissions with a first beam based on a half-duplex mode. The beam management component 198 may be configured to receive second scheduling information for second resources associated with a second beam that is incompatible with the first beam for full duplex communication including downlink reception and uplink transmission that overlap in time. Furthermore, the beam management component 198 may be configured to adjust communication in response to the first beam being incompatible with the second beam for the full duplex communication. In certain aspects, the base station 180 include a beam management component 199 that may be configured to transmit first scheduling information with first resources for transmissions with a first beam based on a half-duplex mode. The beam management component 199 may be configured to transmit second scheduling information for second resources associated with a second beam that is incompatible with the first beam for full duplex communication including downlink reception and uplink transmission that overlap in time. Furthermore, the beam management component 199 may be configured to adjust communication in response to the first beam being incompatible with the second beam for the full duplex communication. Although the following description may be focused on 5G NR, the concepts described herein may be applicable to other similar areas, such as LTE, LTE-A, CDMA, GSM, and other wireless technologies.

Figure 2:
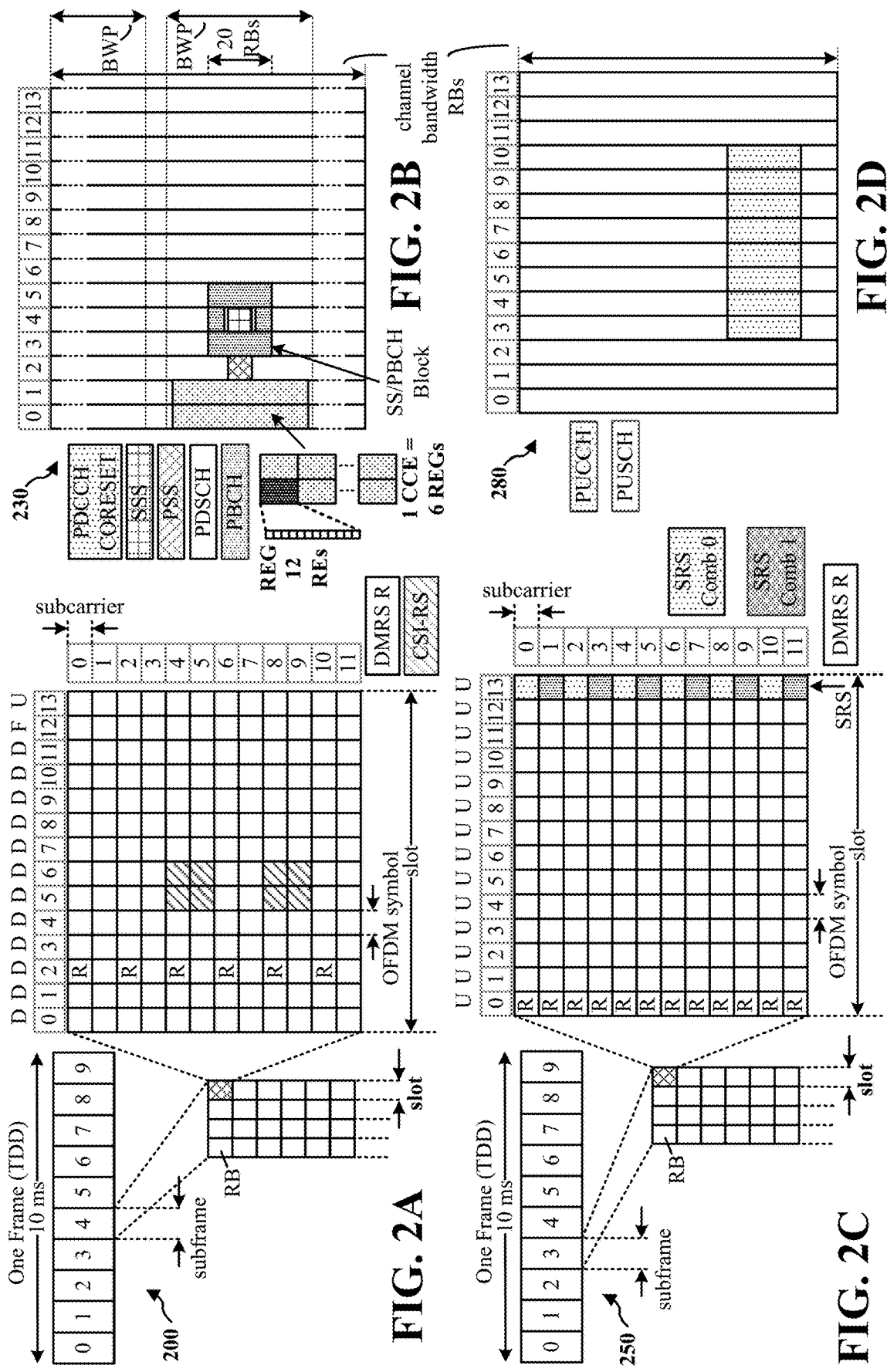
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
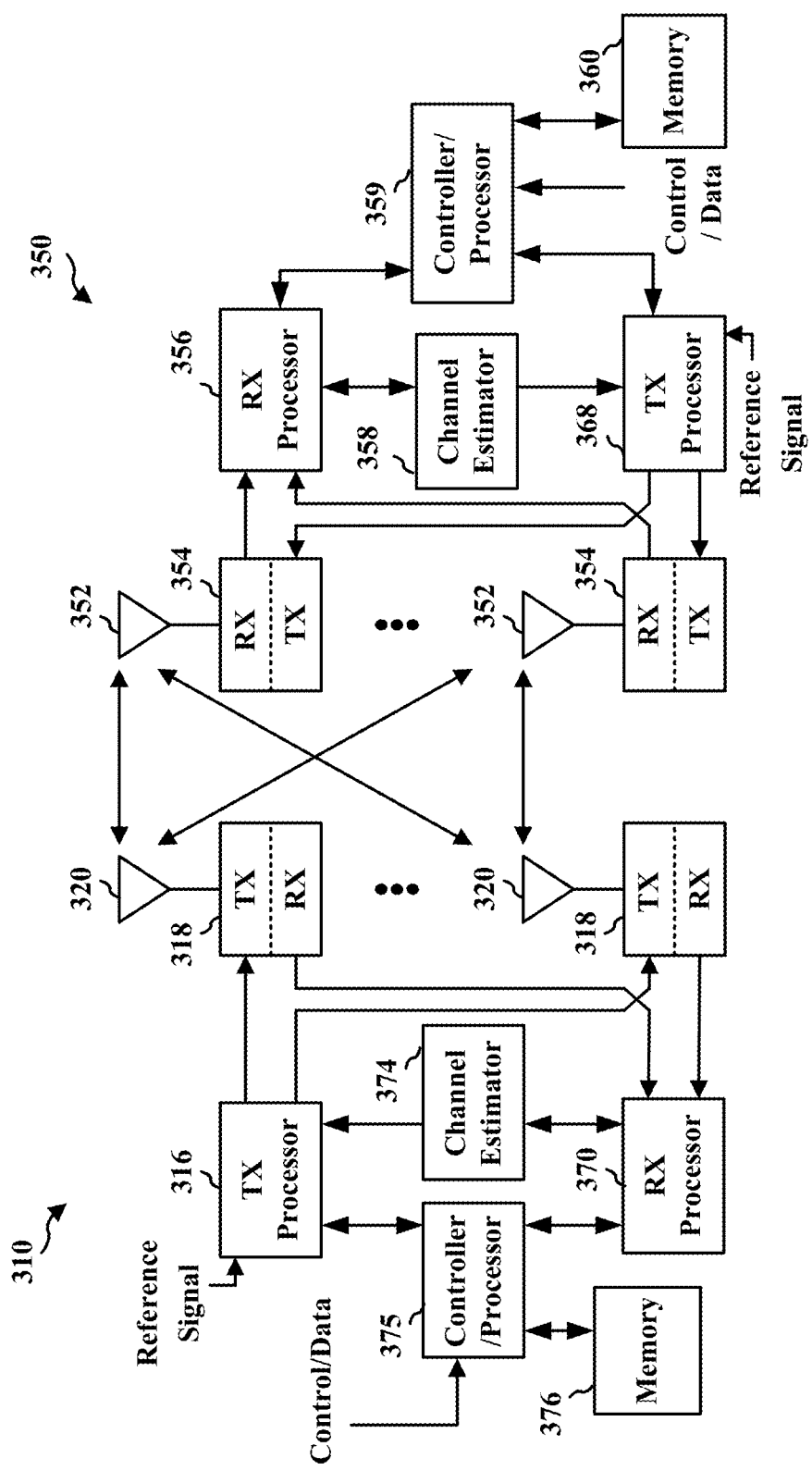
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range, in partially overlapped frequency ranges, or in separate frequency ranges. In some examples, the frequency range may be a mmW frequency range, e.g., frequency range 2 (FR2). In some examples, the frequency range may be a sub-6 GHz frequency range, e.g., frequency range 1 (FR1). The aspects presented herein may also be applied to other frequency ranges. Full duplex capability may be supported at a base station and/or a UE. For example, a UE may transmit uplink communication from one antenna panel and may receive downlink communication with another antenna panel. For another example, a base station may transmit to one UE from one antenna panel and may receive from another UE with another antenna panel. For another example, a base station may transmit to one UE from one antenna panel and may receive from the same UE with another antenna panel. In some examples, the full duplex communication may be conditional on beam or spatial separation or other conditions.

Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

Figure 4A:
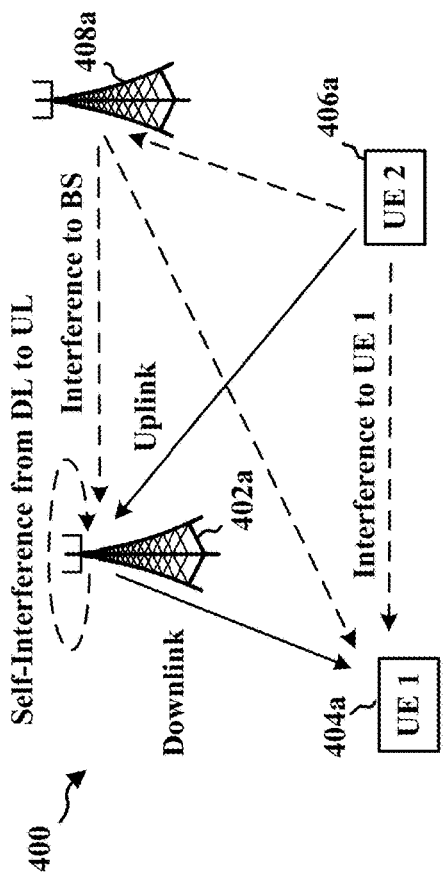
FIGS. 4A, 4B, and 4C illustrate example diagrams of full duplex wireless communication.
Figure 4C:
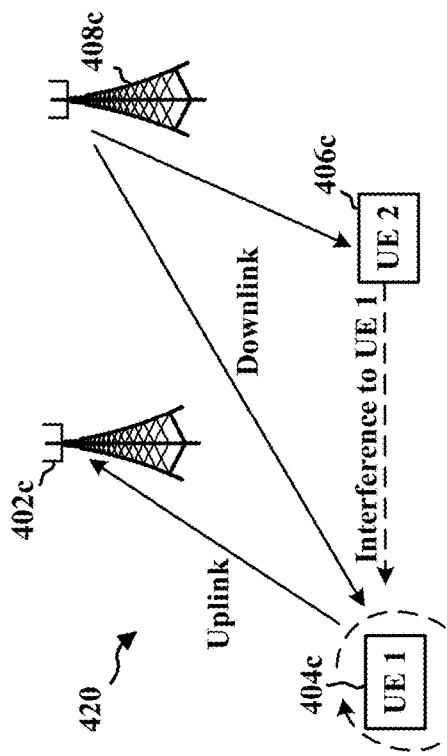
Figure 4B:
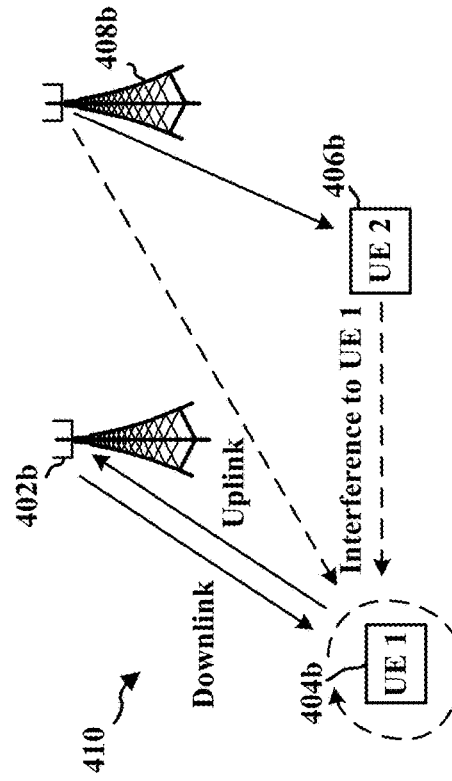

FIGS. 4A-4C illustrate various modes of full duplex communication. Full duplex communication supports transmission and reception of information over a same frequency band, over partially overlapped frequency bands, or over separate frequency bands in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402*a* is in full duplex communication with a first UE 404*a* and a second UE 406*a*. The first base station 402*a* is a full duplex base station, whereas the first UE 404*a* and the second UE 406*a* may be configured as either a half-duplex UE or a full duplex UE. The second UE 406*a* may transmit a first uplink signal to the first base station 402*a* as well as to other base stations, such as a second base station 408*a* in proximity to the second UE 406*a*. The first base station 402*a* transmits a downlink signal to the first UE 404*a* concurrently with receiving the uplink signal from the second UE 406*a*. The base station 402*a* may experience self-interference from the receiving antenna that is receiving the uplink signal from UE 406*a* receiving some of the downlink signal being transmitted to the UE 404*a*. The base station 402*a* may experience additional interference due to signals from the second base station 408*a*. Interference may also occur at the first UE 404*a* based on signals from the second base station 408*a* as well as from uplink signals from the second UE 406*a*.

FIG. 4B shows a second example of full duplex communication 410 in which a first base station 402*b* is in full duplex communication with a first UE 404*b*. In this example, the first base station 402*b* is a full duplex base station and the first UE 404*b* is a full duplex UE. The first base station 402*b* and the UE 404*b* that can concurrently receive and transmit communication that overlaps in time in a same frequency band. The base station and the UE may each experience self-interference, in which a transmitted signal from the device is leaked to a receiver at the same device. The first UE 404*b* may experience additional interference based on one or more signals emitted from a second UE 406*b* and/or a second base station 408*b* in proximity to the first UE 404*b*.

FIG. 4C shows a third example of full duplex communication 420 in which a first UE 404*c* is a full duplex UE in communication with a first base station 402*c* and a second base station 408*c*. The first base station 402*c* and the second base station 408*c* may serve as multiple transmission and reception points (multi-TRPs) for UL and DL communication with the UE 404*c*. The second base station 408*c* may be in communication with a second UE 406*c*. In FIG. 4C, the first UE 404*c* may concurrently transmit an uplink signal to the first base station 402*c* while receiving a downlink signal from the second base station 408*c*. The first UE 404*c* may experience self-interference as a result of the first signal and the second signal being communicated simultaneously, e.g., the uplink signal may leak to, e.g., be received by, the UE's receiver. The first UE 404*c* may experience additional interference from the second UE 406*c*.

Figure 5:
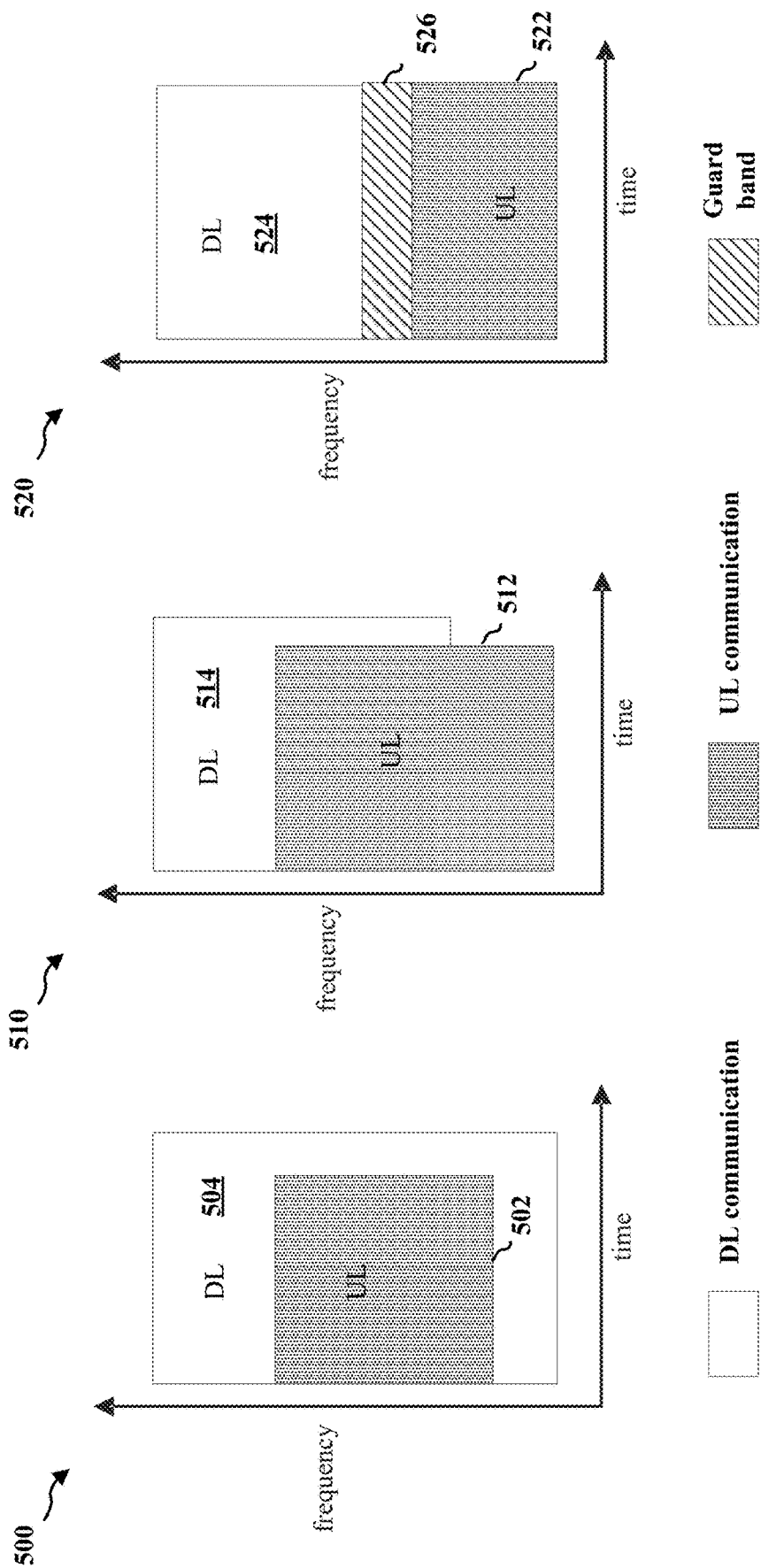
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full duplex (IBFD) resources and a third example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band frequency division duplex (FDD), where uplink and downlink resources may overlap in time using different frequencies, as shown in the third example 520. In the third example 520, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter may extends outside the UL resources, the guard band may reduce interference experienced by the UE. Sub-band FDD may also be referred to as "flexible duplex."

A base station may schedule a UE for half-duplex transmission or reception with a half-duplex beam and may also schedule the UE for transmission/reception with a full-duplex beam. The resources may overlap in time, but the half-duplex beam may be non-compatible for overlapping, full-duplex transmission and reception with the full-duplex beam. The beams may be non-compatible due to e.g., the inability to cancel or sufficiently mitigate the associated self-interference between concurrent transmission and reception on the two beams. The half-duplex beam may be selected based on a first metric for half-duplex communication (e.g., a reference signal received power (RSRP)), and the full-duplex beam may be selected based on a second metric for full-duplex communication (e.g., a signal to interference and noise ratio (SINR)). Thus, the second metric may consider self-interference that is not considered in the first metric. For example, a half-duplex mode beam may be based on the best RSRP beam (e.g. beam 1) among a set of candidate beams. In contrast, the full-duplex mode beam pair may be based on a best SINR beam pair that has the highest signal strength and for which the transmission (Tx) beam creates a small self-interference to its paired reception (Rx) beam (e.g. a beam pair including downlink beam 3 and uplink beam 5). If the first transmission is scheduled for half-duplex downlink beam 1 at time that overlaps the second transmission that is scheduled for the UL beam 5 from the full-duplex beam pair, beam 5 may create self-interference to the downlink reception on beam 1. Thus, beam 5 may be considered incompatible with beam 1 for full-duplex communication that includes transmission and reception that overlaps in time. Aspects described herein relate to methods for handling the incompatible uplink and downlink beams.

Figure 6:
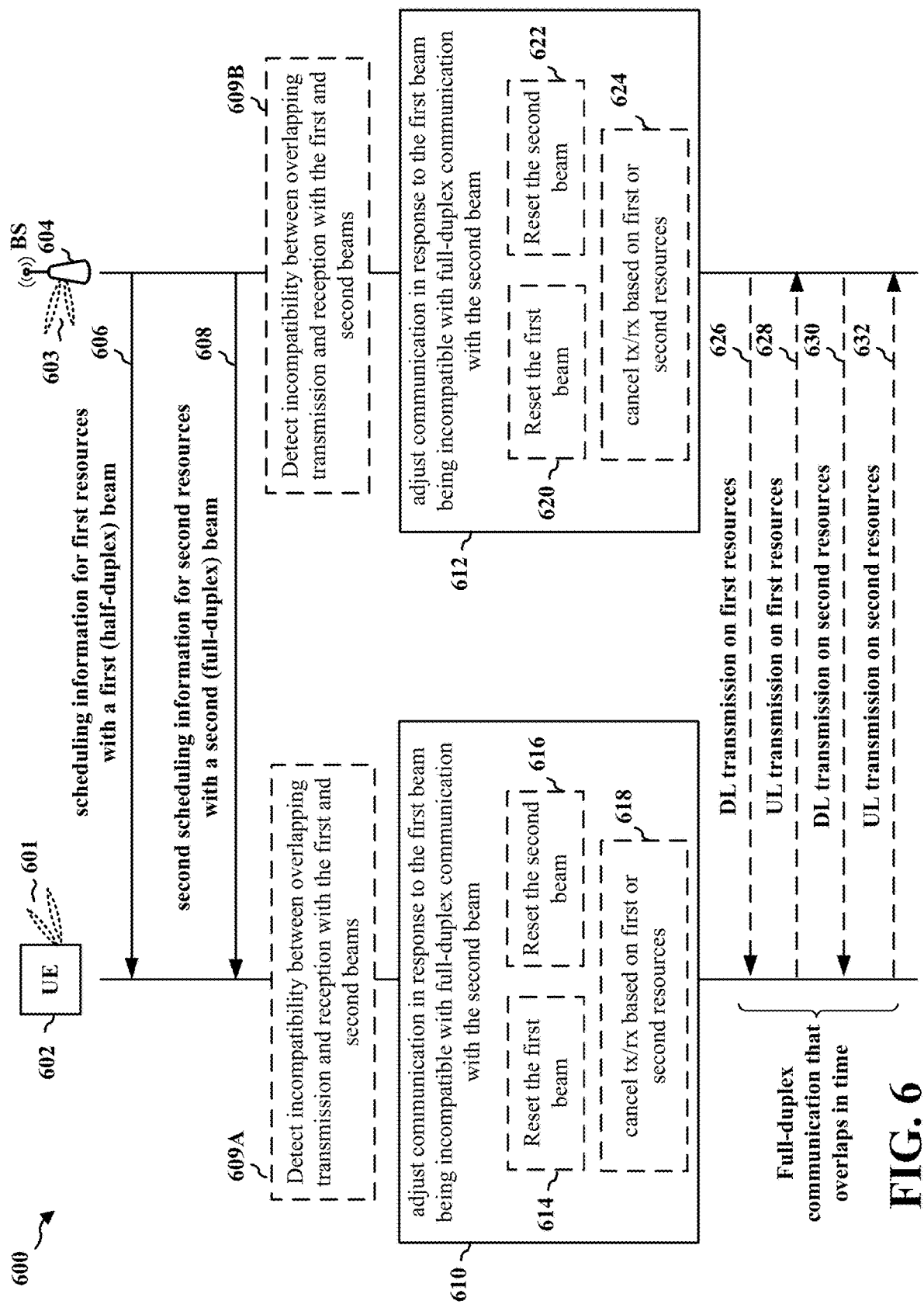
FIG. 6 is a call-flow of a method of wireless communication according to some aspects.

FIG. 6 is a communication flow 600 between a UE 602 and a base station 604 that illustrates example aspects for beam adjustment or cancellation for such non-compatible uplink and downlink beams.

In some aspects, the UE 602 or base station 604 may apply a rule to determine a downlink beam to pair with an existing uplink beam (e.g., 603). For example, to illustrate the concept, the base station 604 may schedule the UE 602, e.g., at 606, for uplink transmissions. The uplink transmissions may include ongoing or periodic transmissions, such as CG transmissions or uplink feedback transmissions for semi-persistent scheduling (SPS) configurations associated with one of the beams 601 of the UE 602. The CG or uplink feedback resources may be configured/scheduled to be periodically transmitted in a half-duplex mode with the indicated beam (e.g., a half-duplex beam or a beam selected based on a half-duplex metric such as RSRP and without consideration for self-interference). The base station 604 may also schedule downlink transmissions to the UE 602, such as CORESET/PDSCH/CSI-RS on a downlink beam, at 608. The downlink beam may be a beam that is part of a full-duplex beam pair that is selected based on one or more full-duplex metrics, such as based on SINR or self-interference between beams of the beam pair. If the downlink beam scheduled at 608 is not compatible for full-duplex communication with the uplink beam scheduled at 606, then the UE 602 and/or base station 604 may apply one or more rules to reset the downlink beam or the uplink beam or to cancel transmission/reception in order to avoid causing self-interference through overlapping uplink transmission and downlink reception on the non-compatible beams. For example, the UE 602 or base station 604 may apply a rule to determine a downlink beam to pair with an existing uplink beam.

In some aspects, the UE 602 or base station 604 may apply a rule to determine an uplink beam to pair with an existing downlink beam. The base station 604 may schedule the UE 602, at 606, for reception of downlink transmissions that are transmitted in a half-duplex mode with a half-duplex beam (e.g., a beam selected based on a half-duplex metric such as RSRP and without consideration for self-interference). For example, the downlink transmissions may include ongoing or periodic downlink transmissions, such as downlink SPS transmissions, or downlink feedback for CG configurations from the UE. At 608, the base station 604 may schedule the UE 602 for uplink transmissions, such as PUCCH/PUSCH/SRS with an uplink beam (e.g., one of beams 601) that is part of a full-duplex beam pair. The full-duplex beam pair may be selected based on one or more full-duplex metrics that include self-interference between the beams in the beam pair. If the uplink beam scheduled at 608 is not compatible for full-duplex communication with the downlink beam scheduled at 606, then the UE 602 and/or base station 604 may apply one or more rules to reset the downlink beam or the uplink beam or to cancel transmission/reception in order to avoid causing self-interference through overlapping uplink transmission and downlink reception on the non-compatible beams. For example, the UE 602 or base station 604 may apply a rule to determine an uplink beam to pair with an existing downlink beam.

As illustrated at 606, the UE 602 may receive from the base station 604, and the base station 604 may transmit to the UE 602, first scheduling information with first resources for transmissions (e.g., uplink or downlink) with a first beam based on a half-duplex mode. The scheduling information may be for periodic resources, such as based on a CG, SPS, or feedback based on the CG or SPS. At 608, the UE 602 may receive from the base station 604, and the base station 604 may transmit to the UE 602, second scheduling information for second resources associated with a second beam that is incompatible with the first beam for full duplex communication, e.g., overlapping transmission and reception in a same frequency range, in partially overlapped frequency ranges, or in separate frequency ranges.

As illustrated at 609A, the UE 602 may determine that the first beam associated with the first resources scheduled at 606 are non-compatible with full-duplex communication with the second beam associated with the second resources scheduled at 608. For example, the UE may determine that transmission on the first beam will cause interference to concurrent reception on the second beam or that transmission on the second beam will cause interference to concurrent reception on the second beam. Similarly, the base station 604 may detect or determine, at 609B, that the two beams are non-compatible for uplink/downlink communication in a full-duplex mode.

At 610, the UE 602 may adjust communication in response to the first beam being incompatible with the second beam for the full duplex communication. In one aspect, adjusting the communication may comprise resetting the first beam in response to the first beam being incompatible with the second beam for the full duplex communication. For example, if a downlink beam, scheduled at 608, is non-compatible with an uplink beam, scheduled at 606, the UE may reset the uplink beam. In some aspects, the base station 604 may indicate a full-duplex beam pair in a TCI state of the scheduled downlink transmissions (e.g., scheduled at 608) with a bi-directional beam pair: one beam for downlink and one beam for uplink. As illustrated at 614, the UE 602 may reset the uplink beam, at 614, for the first resources scheduled at 606 based on the TCI state indication's uplink beam from the full-duplex beam pair scheduled at 608. The base station 604 may similarly reset the uplink beam, at 620.

In another example, if an uplink beam, scheduled at 608, is non-compatible with a downlink beam, scheduled at 606, the UE may reset the downlink beam. In some aspects, the base station 604 may indicate a full-duplex beam pair in a TCI state of the scheduled uplink transmissions (e.g., scheduled at 608) with a bi-directional beam pair: one beam for downlink and one beam for uplink. As illustrated at 614, the UE 602 may reset the downlink beam, at 614, for the first resources scheduled at 606 based on the TCI state indication's downlink beam associated with the bi-directional beam pair from the full-duplex beam pair scheduled at 608. The base station 604 may similarly reset the downlink beam, at 620.

In some aspects, the UE 602 may find the information in a beam failure detection (BFD)/radio link measurement (RLM) reference signal (RS) configuration, e.g., indicating a paired uplink beam in an interference measurement resource (IMR) RS configuration with a full duplex downlink beam associated with the downlink transmissions scheduled at 608. The UE may reset the uplink beam, at 614, for the transmission scheduled at 606, to the paired uplink beam based on the information. The UE 602 may use the reset beam to transmit the uplink transmission 628 concurrently with reception of the downlink transmission 630, e.g., in a full-duplex mode. The base station 604 may similarly reset the uplink beam, at 620. The UE may similarly reset the downlink beam, at 614, for the transmission scheduled at 606, to the paired downlink beam based on the information. The UE 602 may use the reset beam to receive the downlink transmission 626 concurrently with transmission of the uplink transmission 632, e.g., in a full-duplex mode. The base station 604 may similarly reset the downlink beam, at 620.

In some aspects, the UE 602 may reset the uplink beam, at 614, for the uplink transmission scheduled at 606 based on a self-interference measurement (SIM)/beam management (BM) measurement report. The UE may find the candidate uplink beam that pairs with the full-duplex downlink beam associated with the scheduled downlink transmissions, e.g., at 608, in the latest measurement information. The UE 602 may reset the uplink beam, or use the uplink beam, based on the latest measurement information. The UE 602 may use the reset beam to transmit the uplink transmission 628 concurrently with reception of the downlink transmission 630, e.g., in a full-duplex mode. The base station 604 may similarly reset the uplink beam, at 620. The UE may similarly reset the downlink beam, at 614, for the transmission scheduled at 606, to the paired downlink beam based on the latest measurement information. The UE 602 may use the reset beam to receive the downlink transmission 626 concurrently with transmission of the uplink transmission 632, e.g., in a full-duplex mode. The base station 604 may similarly reset the downlink beam, at 620.

In some aspects, if there are overlapping RACH occasions with downlink SSBs in a full-duplex mode, the UE 602 may use the beam that is associated with transmitting a RACH preamble to pair with a full-duplex downlink beam associated with the scheduled downlink transmissions, e.g., scheduled at 608. Thus, the UE 602 may reset the uplink beam, at 614, for the transmission scheduled at 606 for the first resources based on the RACH preamble beam. The UE 602 may use the reset beam to transmit the uplink transmission 628 concurrently with reception of the downlink transmission 630, e.g., in a full-duplex mode. The base station 604 may similarly reset the uplink beam, at 620. The UE may similarly use the SSB beam to pair with the full-duplex uplink beam associated with the scheduled uplink transmission, at 608, to reset the downlink beam, at 614, for the transmission scheduled at 606. The UE 602 may use the reset beam to receive the downlink transmission 626 concurrently with transmission of the uplink transmission 632, e.g., in a full-duplex mode. The base station 604 may similarly reset the downlink beam, at 620.

In another aspect, adjusting the communication may comprise adjusting the second beam for the full duplex communication. The UE 602, and similarly the base station 604, may reset the downlink beam, at 616 or 622, if a first beam for an uplink transmission scheduled at 606 would cause interference to the second beam for the downlink reception scheduled at 608. As an example, to illustrate the concept, if an uplink transmission on a first beam would cause interference to downlink reception scheduled on a second beam, the UE may reset the downlink beam based on a TCI indication to pair with the uplink transmission. The uplink transmission may be for ongoing or periodic uplink transmissions, such as an uplink CG transmission or uplink feedback transmissions for SPS configurations that are periodically transmitted in a full-duplex mode with a TCI state including a bi-directional beam pair: one beam for downlink and one beam for uplink. The UE 602 may reset the downlink beam, at 616, based on the TCI state indication to pair with the CG or feedback for SPS. The UE 602 may use the reset beam to receive the downlink transmission 630 concurrently with transmission of the uplink transmission 632, e.g., in a full-duplex mode. The base station 604 may similarly reset the downlink beam, at 622.

In another example, if an uplink beam, scheduled at 608, is non-compatible with a downlink beam, scheduled at 606, the UE may reset the uplink beam. In some aspects, the base station 604 may indicate a full-duplex beam pair in a TCI state of the scheduled downlink transmissions (e.g., scheduled at 608) with a bi-directional beam pair: one beam for downlink and one beam for uplink. As illustrated at 616, the UE 602 may reset the uplink beam for the second resources scheduled at 608 based on the TCI state indication's uplink beam from the full-duplex beam pair scheduled at 606. The UE 602 may use the reset uplink beam to transmit the uplink transmission 632 concurrently with reception of the downlink transmission 626 in a full-duplex mode. The base station 604 may similarly reset the uplink beam, at 622.

In some aspects, the UE 602 may find the information in the BFD/RLM RS configuration, e.g., with a paired downlink beam in channel measurement resource (CMR) RS configuration with full-duplex uplink beam associated with the uplink transmissions. If the downlink beam, scheduled at 608, is non-compatible with an uplink beam, scheduled at 606, the UE 602 may reset the downlink beam, at 616, based on the information. The UE 602 may use the reset beam to receive the downlink transmission 630 concurrently with transmission of the uplink transmission 632, e.g., in a full-duplex mode. The base station 604 may similarly reset the downlink beam, at 622. In some aspects, if an uplink beam, scheduled at 608, is non-compatible with a downlink beam, scheduled at 606, the UE may reset the uplink beam, at 616, based on information in a BFD/RLM RS configuration based on a paired uplink beam in an IMR RS configuration with a full-duplex downlink beam associated with the downlink transmission, e.g., scheduled at 606. The UE 602 may use the reset uplink beam to transmit the uplink transmission 632 concurrently with reception of the downlink transmission 626 in a full-duplex mode. The base station 604 may similarly reset the uplink beam, at 622.

In some aspects, if a downlink beam, scheduled at 608, is non-compatible with an uplink beam, scheduled at 606, the UE 602 may reset the downlink beam, at 616, based on the SIM/BM measurement report. The UE 602 may find a candidate downlink beam paired with the full-duplex uplink beam associated with the periodic uplink transmissions in the latest measurement information. The UE 602 may reset the downlink beam, at 616, based on the information. The UE 602 may use the reset beam to receive the downlink transmission 630 concurrently with transmission of the uplink transmission 632, e.g., in a full-duplex mode. The base station 604 may similarly reset the downlink beam, at 622. In some aspects, if an uplink beam, scheduled at 608, is non-compatible with a downlink beam, scheduled at 606, the UE may reset the uplink beam, at 622, based on an SIM/BM report. The UE may find the candidate uplink beam paired with the full-duplex downlink beam associated with the downlink transmissions, e.g., scheduled at 606, in latest measurement information. The UE 602 may use the reset uplink beam to transmit the uplink transmission 632 concurrently with reception of the downlink transmission 626 in a full-duplex mode. The base station 604 may similarly reset the uplink beam, at 622.

In some aspects, if there are overlapping RACH occasions with downlink SSBs in a full-duplex mode, and if a downlink beam, scheduled at 608, is non-compatible with an uplink beam, scheduled at 606, the UE 602 may use the SSB beam to pair with a full-duplex uplink beam associated with the uplink transmissions. The UE 602 may reset the downlink beam, at 616, based on the SSB. The UE 602 may use the reset beam to receive the downlink transmission 630 concurrently with transmission of the uplink transmission 632, e.g., in a full-duplex mode. The base station 604 may similarly reset the downlink beam, at 622.

In some aspects, if an uplink beam, scheduled at 608, is non-compatible with a downlink beam, scheduled at 606, the UE may reset the uplink beam, at 622, based on overlapping RACH occasions with downlink SSBs in a full-duplex mode. The UE 602 may use the uplink beam that is associated with transmitting a RACH preamble to pair with the full-duplex downlink beam associated with the downlink transmission scheduled at 606. Thus, the UE may reset the uplink beam based on the RACH preamble beam. The UE 602 may use the reset uplink beam to transmit the uplink transmission 632 concurrently with reception of the downlink transmission 626 in a full-duplex mode. The base station 604 may similarly reset the uplink beam, at 622.

In yet another aspect, adjusting the communication may comprise canceling transmission or reception of one or more of the transmissions based on the first resources in response to the first beam being incompatible with the second beam for the full duplex communication, as shown at 618. In a further aspect, adjusting the communication may comprise canceling transmission or reception of the second resources in response to the first beam being incompatible with the second beam for the full duplex communication. For example, if a downlink beam for reception of a downlink transmission, scheduled at 608, is non-compatible with an existing uplink transmission, scheduled at 606, the UE may cancel or skip reception of the downlink transmission. The UE 602 may transmit the uplink transmission 628 and may skip the reception of the downlink transmission 630. In other aspects, if a downlink beam for reception of a downlink transmission, scheduled at 608, is non-compatible with an existing uplink transmission, scheduled at 606, the UE may cancel or skip transmission of the uplink transmission. The UE 602 may receive the downlink transmission 624 and may skip the uplink transmission 628. The downlink transmission may be a dynamic, or non-periodic, transmission, and the uplink transmission may be an ongoing periodic transmission. In other examples, the downlink transmission may be a periodic transmission and the uplink transmission may be a dynamic, or non-periodic, transmission.

If an uplink beam for an uplink transmission, scheduled at 608, is non-compatible with a beam for reception of an existing downlink transmission, scheduled at 606, the UE may cancel or skip reception of the downlink transmission. The UE 602 may transmit the uplink transmission 628 and may skip the reception of the downlink transmission 630. In other aspects, if an uplink beam for an uplink transmission, scheduled at 608, is non-compatible with a beam for reception of an existing downlink transmission, scheduled at 606, the UE may cancel or skip transmission of the uplink transmission. The UE 602 may receive the downlink transmission 624 and may skip the uplink transmission 628. The downlink transmission may be a dynamic, or non-periodic, transmission, and the uplink transmission may be an ongoing periodic transmission. In other examples, the downlink transmission may be a periodic transmission and the uplink transmission may be a dynamic, or non-periodic, transmission.

At 612, the base station 604 may similarly adjust communication in response to the first beam being incompatible with the second beam for the full duplex communication. In one aspect, adjusting the communication may comprise adjusting the first beam in response to the first beam being incompatible with the second beam for the full duplex communication. In another aspect, adjusting the communication may comprise adjusting the second beam for the full duplex communication. In yet another aspect, adjusting the communication may comprise canceling transmission or reception of one or more of the periodic transmissions in response to the first beam being incompatible with the second beam for the full duplex communication. In a further aspect, adjusting the communication may comprise canceling transmission or reception of the second resources in response to the first beam being incompatible with the second beam for the full duplex communication.

FIG. 7 is a diagram 700 illustrating example aspects of the first scheduling information and the second scheduling information. The first scheduling information may relate to ongoing periodic transmissions in the half duplex mode, in some examples. In one aspect, there may be ongoing uplink configured grant (CG) transmissions or uplink feedback transmissions for semi-persistent scheduling (SPS) configurations that are periodically transmitted in the half duplex mode according to the first scheduling information, and the base station may also schedule downlink transmissions, such as transmissions of a CORESET, a PDSCH, or a CSI-RS, with the second scheduling information. The downlink transmissions may not be compatible with the beam scheduled for the ongoing periodic uplink transmissions. For example, use of the uplink beam may cause self-interference to reception on the downlink beam if used for full duplex communication. Therefore, in this aspect, the first scheduling information, which may be associated with a first beam, may be for uplink resources for periodic uplink transmissions with an uplink beam and the second scheduling information, which may be associated with a second beam, may be for downlink resources for reception of a downlink transmission with a downlink beam that is incompatible, for the full duplex communication, with the uplink beam.

In another aspect, there may be ongoing, periodic downlink transmissions such as downlink SPS transmissions or downlink feedback transmissions for CG configurations that are transmitted in the half duplex mode according to the first scheduling information, while at the same time the base station may also schedule uplink transmissions, such as transmissions of a PUCCH, a PUSCH, or an SRS, with the second scheduling information. The beam for the uplink transmissions may not be compatible with the beam for the preexisting periodic downlink transmissions. For example, use of the uplink beam may cause self-interference to reception on the downlink beam if used for full duplex communication. Therefore, in this aspect, the first scheduling information, which may be associated with a first beam, may be for downlink resources for periodic reception of downlink transmissions with a downlink beam and the second scheduling information, which may be associated with a second beam, may be for uplink resources for an uplink transmission with an uplink beam that is incompatible, for the full duplex communication, with the downlink beam.

Figure 8:
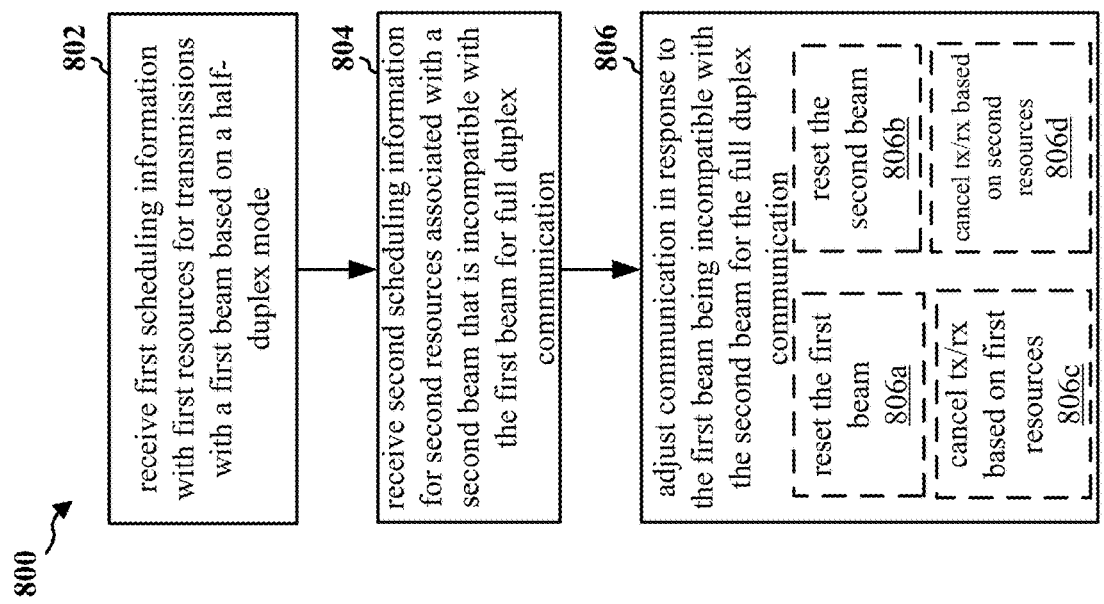
FIG. 8 is a flowchart of a method of wireless communication

FIG. 8 is a flowchart 800 of a method of wireless communication. The method may be performed by a UE (e.g., the UE 104; the UE 602; the apparatus 1402). Optional aspects are illustrated with a dashed line. The method may enable a UE to address potential self-interference that may occur with full-duplex communication based on incompatible beams, such as described in connection with the example aspects of FIG. 6.

At 802, the UE may receive first scheduling information with first resources for transmissions with a first beam based on a half-duplex mode. For example, 802 may be performed by the first scheduling information component 1440 of FIG. 14 via the reception component 1430. The transmissions may be periodic or may be dynamic or aperiodic. The first scheduling information may be for one or more uplink transmissions. The first scheduling information may provide a grant for periodic uplink transmissions, such as a CG or uplink feedback associated with SPS transmissions. The first scheduling information may be for reception of one or more downlink transmissions. The first scheduling information may be for reception of periodic downlink transmissions, such as SPS transmissions or downlink feedback for CG transmissions.

At 804, the UE may receive second scheduling information for second resources associated with a second beam that is incompatible with the first beam for full duplex communication including downlink reception and uplink transmission that overlap in time. For example, the first beam may be selected based on a first metric (e.g., RSRP) for the half-duplex mode and the second beam may be selected based on a second metric (e.g., SINR or SIM) for a full-duplex mode wherein the second beam is selected to be paired with a third beam for the full-duplex mode. The second metric may include a self-interference metric that is not comprised in the first metric. The second beam may be incompatible with the first beam based on self-interference between overlapping full-duplex communication on the first beam and the second beam as a pair for the full-duplex mode. For example, an uplink transmission on the first or second beam may cause a threshold level of self-interference to downlink reception on the other beam in a full-duplex mode. For example, 804 may be performed by the second scheduling information component 1442 of FIG. 14 via the reception component 1430. The second scheduling information may be for reception of a downlink transmission, such as a CORESET, PDSCH, and/or CSI-RS. The second scheduling information may be for an uplink transmission, such as for PUCCH, PUSCH, and/or SRS.

At 806, the UE may adjust communication in response to the first beam being incompatible with the second beam for the full duplex communication. For example, 806 may be performed by the communication adjustment component 1444 of FIG. 14. The UE may adjust the communication, at 806, based on any of the aspects described in connection with 610 in FIG. 6, for example.

In one aspect, adjusting the communication at 806 may comprise, at 806a, resetting the first beam for transmission or reception of the first resources in response to the first beam being incompatible with the second beam for the full duplex communication. In particular, the UE may transmit or receive the periodic transmissions using a paired beam and not the first beam indicated in the first scheduling information. The paired beam may comprise the second beam, but not the first beam. As described above, in different aspects, the first beam may correspond to either an uplink beam with which existing periodic uplink transmissions on the uplink resources are performed, or a downlink beam with which existing periodic downlink transmissions on the downlink resources are performed. In case the first beam corresponds to an uplink beam, the second beam may correspond to a downlink beam; and in case the first beam corresponds to a downlink beam, the second beam may correspond to an uplink beam. In case the second beam corresponds to a downlink beam, the paired beam may comprise the second beam and an uplink beam that is not the first beam for the full duplex communication, and vice versa. FIGS. 9A-D are flowcharts 900A-D of methods of adjusting the first beam according to different aspects. FIG. 9A is a flowchart 900A of a method of adjusting the first beam. FIG. 9B is a flowchart 900B of a method of adjusting the first beam. FIG. 9C is a flowchart 900C of a method of adjusting the first beam. FIG. 9D is a flowchart 900D of a method of adjusting the first beam.

In one aspect, the base station may indicate a beam pair (one uplink beam and one downlink beam) for the full duplex communication in a TCI state field in the second scheduling information. It should be appreciated that a TCI state may define a quasi co-location (QCL) assumption between a source RS and a target RS. Referring to FIG. 9A, at 902, the UE may receive, in a transmission configuration indicator (TCI) state field in the second scheduling information, an indication of a full duplex beam pair comprising a paired beam that is paired with the second beam. At 904, the UE may transmit or receive one or more transmission using the paired beam indicated in the second scheduling information and not the first beam indicated in the first scheduling information.

In another aspect, the UE may obtain the beam pair information in a reference signal configuration for beam failure detection or radio link management. If the second beam is a downlink beam, a beam indicated in an interference measurement resource (IMR) reference signal (RS) configuration may be paired with the second beam for the full duplex communication. On the other hand, if the second beam is an uplink beam, a beam indicated in a channel measurement resource (CMR) reference signal (RS) configuration may be paired with the second beam for the full duplex communication. It should be appreciated that the IMR may be a CSI-RS or a CSI-interference measurement (CSI-IM) resource, and the CMR may be a CSI-RS resource. Referring to FIG. 9B, at 906, the UE may receive a reference signal configuration for beam failure detection or radio link management that indicates a paired beam that is paired with the second beam. At 908, the UE may transmit or receive one or more transmission using the paired beam and not the first beam indicated in the first scheduling information.

In yet another aspect, the UE may obtain the beam pair information based on a latest self-interference measurement (SIM) or beam management (BM) measurement report. A best candidate beam determined based on the latest SIM or BM measurement report may be paired with the second beam for the full duplex communication. Referring to FIG. 9C, at 910, the UE may perform a self-interference measurement (SIM) or a beam management (BM) measurement. At 912, the UE may determine a paired beam for the full duplex communication with the second beam based on the SIM or the BM measurement. At 914, the UE may transmit or receive one or more transmission using the paired beam and not the first beam indicated in the first scheduling information.

In still another aspect, there may be overlapping random access channel (RACH) occasions with downlink synchronization signal blocks (SSBs). If the second beam is a downlink beam, a beam associated with transmitting the RACH preamble may be paired with the second beam for the full duplex communication. On the other hand, if the second beam is an uplink beam, a beam associated with transmitting the SSB may be paired with the second beam for the full duplex communication. Referring to FIG. 9D, at 916, the UE may identify a paired beam for the full duplex communication with the second beam based on a downlink synchronization signal block (SSB) that overlaps with random access channel (RACH) occasions in full-duplex mode. At 918, the UE may transmit or receive one or more transmission using the paired beam and not the first beam indicated in the first scheduling information.

In another aspect, adjusting the communication at 806 may comprise, at 806b, resetting the second beam for transmission or reception of second resources. In particular, the UE may transmit or receive the communication based on the second scheduling information using the paired beam indicated in the first scheduling information and not the second beam indicated in the second scheduling information. The paired beam may comprise the first beam, but not the second beam. As described above, in different aspects, the second beam may correspond to either a downlink beam when the first beam corresponds to an uplink beam, or an uplink beam when the first beam corresponds to a downlink beam. In case the first beam corresponds to an uplink beam, the paired beam may comprise the first beam and a downlink beam that is not the second beam for the full duplex communication, and vice versa. FIGS. 10A-D are flowcharts 1000A-D of methods of adjusting the second beam according to different aspects. FIG. 10A is a flowchart 1000A of a method of adjusting the second beam. FIG. 10B is a flowchart 1000B of a method of adjusting the second beam. FIG. 10C is a flowchart 1000C of a method of adjusting the second beam. FIG. 10D is a flowchart 1000D of a method of adjusting the second beam.

In one aspect, the base station may indicate a beam pair (one uplink beam and one downlink beam) for the full duplex communication in a transmission configuration indicator (TCI) state field in the first scheduling information. It should be appreciated that a TCI state may define a quasi co-location (QCL) assumption between a source reference signal (RS) and a target RS. Referring to FIG. 10A, at 1002, the UE may receive, in a transmission configuration indicator (TCI) state field in the first scheduling information, an indication of a full duplex beam pair comprising a paired beam that is paired with the first beam. At 1004, the UE may transmit or receive the communication based on the second scheduling information using the paired beam indicated in the first scheduling information and not the second beam indicated in the second scheduling information.

In another aspect, the UE may obtain the beam pair information in a reference signal configuration for beam failure detection or radio link management. If the first beam is an uplink beam, a beam indicated in a channel measurement resource (CMR) reference signal (RS) configuration may be paired with the first beam for the full duplex communication. On the other hand, if the first beam is a downlink beam, a beam indicated in an interference measurement resource (IMR) reference signal (RS) configuration may be paired with the first beam for the full duplex communication. It should be appreciated that the IMR may be a CSI-RS or a CSI-interference measurement (CSI-IM) resource, and the CMR may be a CSI-RS resource. Referring to FIG. 10B, at 1006, the UE may receive a reference signal configuration for beam failure detection or radio link management that indicates a paired beam that is paired with the first beam. At 1008, the UE may transmit or receive the communication based on the second scheduling information using the paired beam indicated in the first scheduling information and not the second beam indicated in the second scheduling information.

In yet another aspect, the UE may obtain the beam pair information based on a latest self-interference measurement (SIM) or beam management (BM) measurement report. A best candidate beam determined based on the latest SIM or BM measurement report may be paired with the first beam for the full duplex communication. Referring to FIG. 10C, at 1010, the UE may perform a self-interference measurement (SIM) or a beam management (BM) measurement. At 1012, the UE may determine a paired beam for the full duplex communication with the first beam based on the SIM or the BM measurement. At 1014, the UE may transmit or receive the communication based on the second scheduling information using the paired beam indicated in the first scheduling information and not the second beam indicated in the second scheduling information.

In still another aspect, there may be overlapping random access channel (RACH) occasions with downlink synchronization signal blocks (SSBs). If the first beam is an uplink beam, a beam associated with transmitting the SSB may be paired with the first beam for the full duplex communication. On the other hand, if the first beam is a downlink beam, a beam associated with transmitting the RACH preamble may be paired with the first beam for the full duplex communication. Referring to FIG. 10D, at 1016, the UE may identify a paired beam for the full duplex communication with the first beam based on a downlink synchronization signal block (SSB) that overlaps with random access channel (RACH) occasions in full-duplex mode. At 1018, the UE may transmit or receive the communication based on the second scheduling information using the paired downlink beam indicated in the first scheduling information and not the second beam indicated in the second scheduling information.

In yet another aspect, adjusting the communication at 806 may comprise, at 806c, canceling transmission or reception of one or more transmissions based on the first resources in response to the first beam being incompatible with the second beam for the full duplex communication. In a further aspect, adjusting the communication at 806 may comprise, at 806d, canceling transmission or reception of the second resources in response to the first beam being incompatible with the second beam for the full duplex communication.

Figure 11:
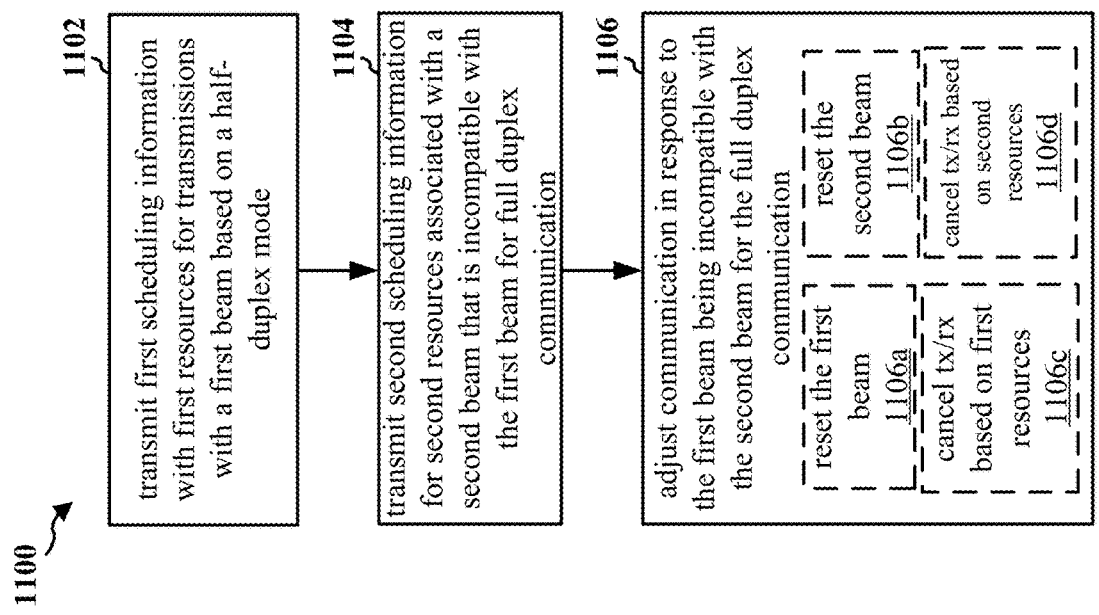
FIG. 11 is a flowchart of a method of wireless communication.

FIG. 11 is a flowchart 1100 of a method of wireless communication. The method may be performed by a base station (e.g., the base station 102/180; the base station 604; the apparatus 1502). Optional aspects are illustrated with a dashed line. The method may enable a base station to address potential self-interference that may occur with full-duplex communication based on incompatible beams, such as described in connection with the example aspects of FIG. 6.

At 1102, the base station may transmit first scheduling information with first resources for transmissions with a first beam based on a half-duplex mode. For example, 1102 may be performed by the first scheduling information component 1540 of FIG. 15 via the transmission component 1534. The transmissions may be periodic or may be dynamic or aperiodic. The first scheduling information may be for one or more uplink transmissions. The first scheduling information may provide a grant for periodic uplink transmissions, such as a CG or uplink feedback associated with SPS transmissions. The first scheduling information may be for reception of one or more downlink transmissions. The first scheduling information may be for reception of periodic downlink transmissions, such as SPS transmissions or downlink feedback for CG transmissions.

At 1104, the base station may transmit second scheduling information for second resources associated with a second beam that is incompatible with the first beam including downlink transmission and uplink reception that overlap in time. For example, the first beam may be selected based on a first metric (e.g., RSRP) for the half-duplex mode and the second beam may be selected based on a second metric (e.g., SINR or SIM) for a full-duplex mode wherein the second beam is selected to be paired with a third beam for the full-duplex mode. The second metric may include a self-interference metric that is not comprised in the first metric. The second beam may be incompatible with the first beam based on self-interference between overlapping full-duplex communication on the first beam and the second beam as a pair for the full-duplex mode. For example, an uplink transmission on the first or second beam may cause a threshold level of self-interference to downlink reception on the other beam in a full-duplex mode. The second scheduling information may be for reception of a downlink transmission, such as a CORESET, PDSCH, and/or CSI-RS. The second scheduling information may be for an uplink transmission, such as for PUCCH, PUSCH, and/or SRS. For example, 1104 may be performed by the second scheduling information component 1542 of FIG. 15 via the transmission component 1534.

At 1106, the base station may adjust communication in response to the first beam being incompatible with the second beam for the full duplex communication. For example, 1106 may be performed by the communication adjustment component 1544 of FIG. 15. The base station may adjust the communication, at 1106, based on any of the aspects described in connection with 612 in FIG. 6, for example.

In one aspect, adjusting the communication at 1106 may comprise, at 1106a, adjusting the first beam in response to the first beam being incompatible with the second beam for the full duplex communication. In particular, the base station may transmit or receive the periodic transmissions using a paired beam and not the first beam indicated in the first scheduling information. The paired beam may comprise the second beam, but not the first beam. As described above, in different aspects, the first beam may correspond to either an uplink beam with which preexisting periodic uplink transmissions on the uplink resources are performed, or a downlink beam with which preexisting periodic downlink transmissions on the downlink resources are performed. In case the first beam corresponds to an uplink beam, the second beam may correspond to a downlink beam; and in case the first beam corresponds to a downlink beam, the second beam may correspond to an uplink beam. In case the second beam corresponds to a downlink beam, the paired beam may comprise the second beam and an uplink beam that is not the first beam for the full duplex communication, and vice versa. FIGS. 12A-D are flowcharts 1200A-D of methods of adjusting the first beam according to different aspects. FIG. 12A is a flowchart 1200A of a method of adjusting the first beam. FIG. 12B is a flowchart 1200B of a method of adjusting the first beam. FIG. 12C is a flowchart 1200C of a method of adjusting the first beam. FIG. 12D is a flowchart 1200D of a method of adjusting the first beam.

In one aspect, the base station may indicate a beam pair (one uplink beam and one downlink beam) for the full duplex communication in a transmission configuration indicator (TCI) state field in the second scheduling information. It should be appreciated that a TCI state may define a quasi co-location (QCL) assumption between a source reference signal (RS) and a target RS. Referring to FIG. 12A, at 1202, the base station may transmit, in a transmission configuration indicator (TCI) state field in the second scheduling information, an indication of a full duplex beam pair comprising a paired beam that is paired with the second beam. At 1204, the base station may transmit or receive one or more transmission using the paired beam indicated in the second scheduling information and not the first beam indicated in the first scheduling information.

In another aspect, the UE may obtain the beam pair information in a reference signal configuration for beam failure detection or radio link management. If the second beam is a downlink beam, a beam indicated in an interference measurement resource (IMR) reference signal (RS) configuration may be paired with the second beam for the full duplex communication. On the other hand, if the second beam is an uplink beam, a beam indicated in a channel measurement resource (CMR) reference signal (RS) configuration may be paired with the second beam for the full duplex communication. It should be appreciated that the IMR may be a CSI-RS or a CSI-interference measurement (CSI-IM) resource, and the CMR may be a CSI-RS resource. Referring to FIG. 12B, at 1206, the base station may transmit a reference signal configuration for beam failure detection or radio link management that indicates a paired beam that is paired with the second beam. At 1208, the base station may transmit or receive one or more transmission using the paired beam and not the first beam indicated in the first scheduling information.

In yet another aspect, the UE may obtain the beam pair information based on a latest self-interference measurement (SIM) or beam management (BM) measurement report. A best candidate beam determined based on the latest SIM or BM measurement report may be paired with the second beam for the full duplex communication. Referring to FIG. 12C, at 1210, the base station may receive an indication of a paired beam for the full duplex communication with the second beam. The paired beam may be determined based on a self-interference measurement (SIM) or a beam management (BM) measurement at a user equipment (UE). At 1212, the base station may transmit or receive one or more transmission using the paired beam and not the first beam indicated in the first scheduling information.

In still another aspect, there may be overlapping random access channel (RACH) occasions with downlink synchronization signal blocks (SSBs). If the second beam is a downlink beam, a beam associated with transmitting the RACH preamble may be paired with the second beam for the full duplex communication. On the other hand, if the second beam is an uplink beam, a beam associated with transmitting the SSB may be paired with the second beam for the full duplex communication. Referring to FIG. 12D, at 1214, the UE may receive an indication of a paired beam for the full duplex communication with the second beam. The paired beam may be identified at a user equipment (UE) based on a downlink synchronization signal block (SSB) that overlaps with random access channel (RACH) occasions in full-duplex mode. At 1216, the base station may transmit or receive one or more transmission using the paired beam and not the first beam indicated in the first scheduling information.

In another aspect, adjusting the communication at 1106 may comprise, at 1106b, adjusting the second beam for the full duplex communication. In particular, the base station may transmit or receive the communication based on the second scheduling information using the paired beam indicated in the first scheduling information and not the second beam indicated in the second scheduling information. The paired beam may comprise the first beam, but not the second beam. As described above, in different aspects, the second beam may correspond to either a downlink beam when the first beam corresponds to an uplink beam, or an uplink beam when the first beam corresponds to a downlink beam. In case the first beam corresponds to an uplink beam, the paired beam may comprise the first beam and a downlink beam that is not the second beam for the full duplex communication, and vice versa. FIGS. 13A-D are flowcharts 1300A-D of methods of adjusting the second beam according to different aspects. FIG. 13A is a flowchart 1300A of a method of adjusting the second beam. FIG. 13B is a flowchart 1300B of a method of adjusting the second beam. FIG. 13C is a flowchart 1300C of a method of adjusting the second beam. FIG. 13D is a flowchart 1300D of a method of adjusting the second beam.

In one aspect, the base station may indicate a beam pair (one uplink beam and one downlink beam) for the full duplex communication in a transmission configuration indicator (TCI) state field in the first scheduling information. It should be appreciated that a TCI state may define a quasi co-location (QCL) assumption between a source reference signal (RS) and a target RS. Referring to FIG. 13A, at 1302, the base station may transmit, in a transmission configuration indicator (TCI) state field in the first scheduling information, an indication of a full duplex beam pair comprising a paired beam that is paired with the first beam. At 1304, the base station may transmit or receive the communication based on the second scheduling information using the paired beam indicated in the first scheduling information and not the second beam indicated in the second scheduling information.

In another aspect, the UE may obtain the beam pair information in a reference signal configuration for beam failure detection or radio link management. If the first beam is an uplink beam, a beam indicated in a channel measurement resource (CMR) reference signal (RS) configuration may be paired with the first beam for the full duplex communication. On the other hand, if the first beam is a downlink beam, a beam indicated in an interference measurement resource (IMR) reference signal (RS) configuration may be paired with the first beam for the full duplex communication. It should be appreciated that the IMR may be a CSI-RS or a CSI-interference measurement (CSI-IM) resource, and the CMR may be a CSI-RS resource. Referring to FIG. 13B, at 1306, the base station may transmit a reference signal configuration for beam failure detection or radio link management that indicates a paired beam that is paired with the first beam. At 1308, the base station may transmit or receive the communication based on the second scheduling information using the paired beam indicated in the first scheduling information and not the second beam indicated in the second scheduling information.

In yet another aspect, the UE may obtain the beam pair information based on a latest self-interference measurement (SIM) or beam management (BM) measurement report. A best candidate beam determined based on the latest SIM or BM measurement report may be paired with the first beam for the full duplex communication. Referring to FIG. 13C, at 1310, the base station may receive an indication of a paired beam for the full duplex communication with the first beam. The paired beam may be determined based on a self-interference measurement (SIM) or a beam management (BM) measurement at a user equipment (UE). At 1312, the base station may transmit or receive the communication based on the second scheduling information using the paired beam indicated in the first scheduling information and not the second beam indicated in the second scheduling information.

In still another aspect, there may be overlapping random access channel (RACH) occasions with downlink synchronization signal blocks (SSBs). If the first beam is an uplink beam, a beam associated with transmitting the SSB may be paired with the first beam for the full duplex communication. On the other hand, if the first beam is a downlink beam, a beam associated with transmitting the RACH preamble may be paired with the first beam for the full duplex communication. Referring to FIG. 13D, at 1314, the base station may receive an indication of a paired beam for the full duplex communication with the first beam. The paired beam may be identified at a user equipment (UE) based on a downlink synchronization signal block (SSB) that overlaps with random access channel (RACH) occasions in full-duplex mode. At 1316, the base station may transmit or receive the communication based on the second scheduling information using the paired downlink beam indicated in the first scheduling information and not the second beam indicated in the second scheduling information.

In yet another aspect, adjusting the communication at 1106 may comprise, at 1106c, canceling transmission or reception of one or more of the periodic transmissions in response to the first beam being incompatible with the second beam for the full duplex communication. In a further aspect, adjusting the communication at 1106 may comprise, at 1106d, canceling transmission or reception of the second resources in response to the first beam being incompatible with the second beam for the full duplex communication.

Figure 14:
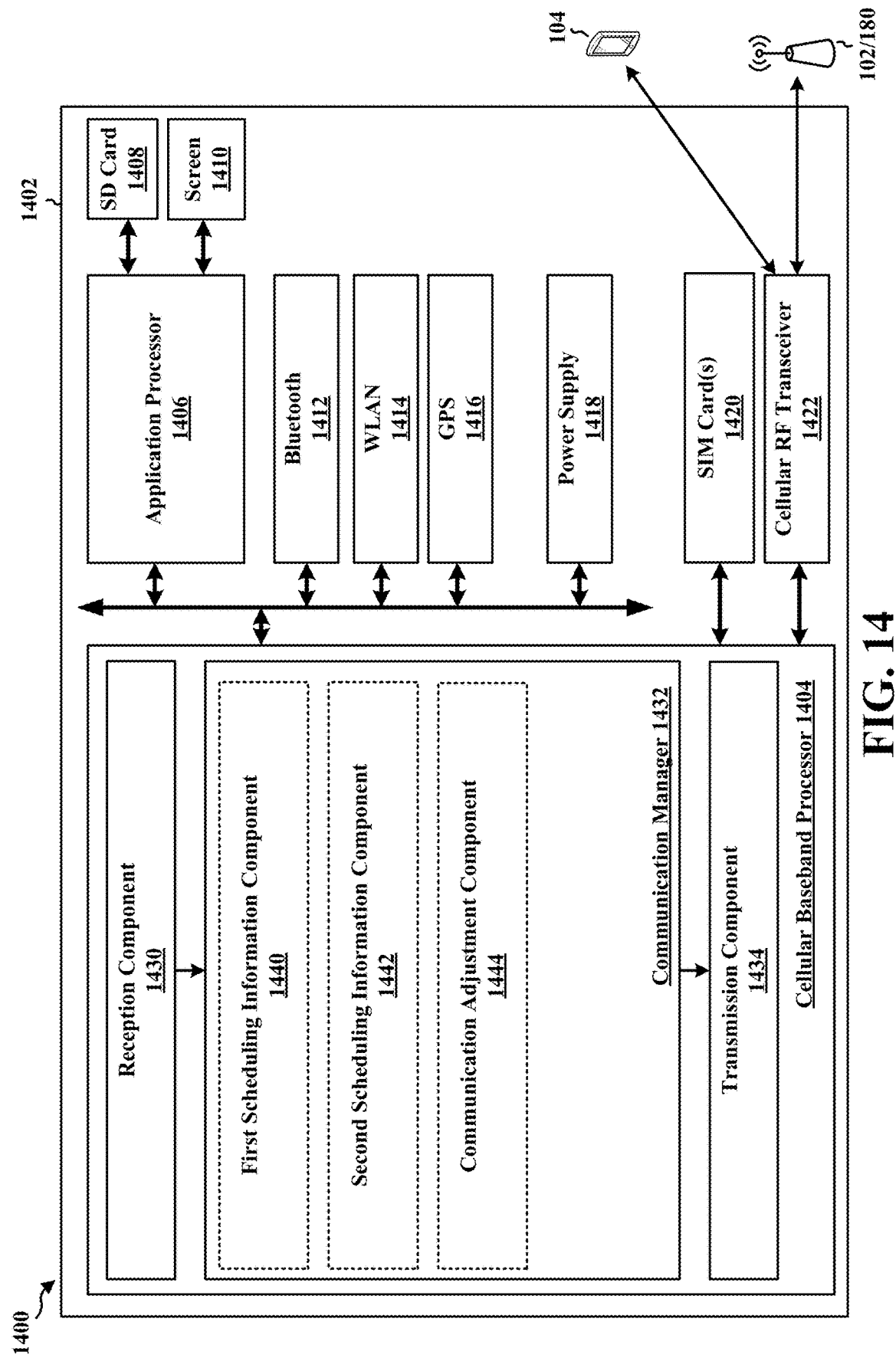
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a first scheduling information component 1440 that is configured to receive first scheduling information with first resources for periodic transmissions with a first beam based on a half-duplex mode, e.g., as described in connection with 802 of FIG. 8. The communication manager 1432 further includes a second scheduling information component 1442 that is configured to receive second scheduling information for second resources associated with a second beam that is incompatible with the first beam for full duplex communication including downlink reception and uplink transmission that overlap in time, e.g., as described in connection with 804 of FIG. 8. The communication manager 1432 further includes a communication adjustment component 1444 that is configured to adjust communication in response to the first beam being incompatible with the second beam for the full duplex communication, e.g., as described in connection with 806 of FIG. 8.

The apparatus may include additional components that perform each of the blocks of the algorithm in the aforementioned flowcharts of FIGS. 8, 9A-D, and 10A-D. As such, each block in the aforementioned flowcharts of FIGS. 8, 9A-D, and 10A-D may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for receiving first scheduling information with first resources for periodic transmissions with a first beam based on a half-duplex mode; means for receiving second scheduling information for second resources associated with a second beam that is incompatible with the first beam for full duplex communication including downlink reception and uplink transmission that overlap in time; and means for adjusting communication in response to the first beam being incompatible with the second beam for the full duplex communication. The aforementioned means may be one or more of the aforementioned components of the apparatus 1402 configured to perform the functions recited by the aforementioned means. As described supra, the apparatus 1402 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 15:
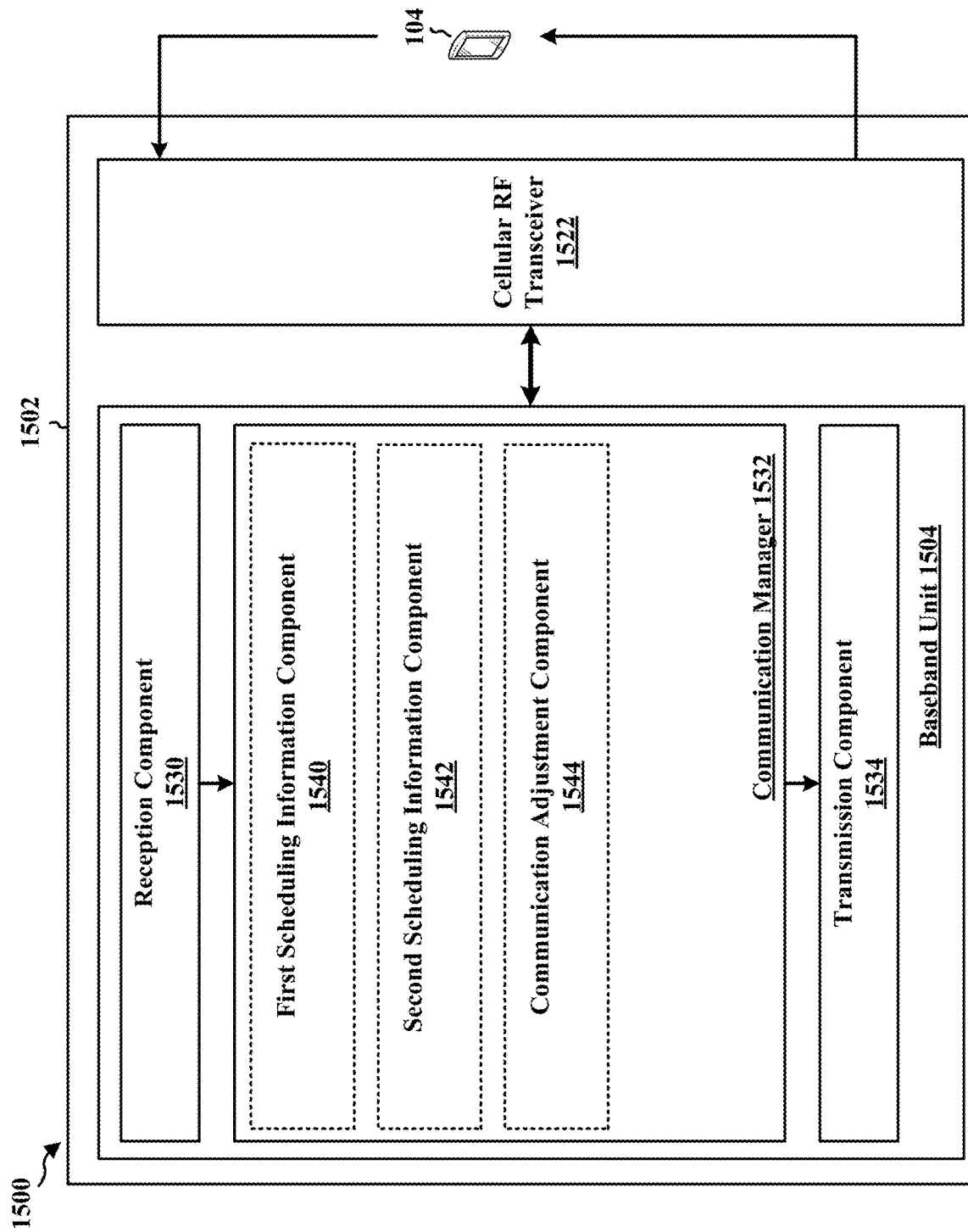
FIG. 15 is a diagram illustrating an example of a hardware implementation for an example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a first scheduling information component 1540 that may transmit first scheduling information with first resources for periodic transmissions with a first beam based on a half-duplex mode, e.g., as described in connection with 1102 of FIG. 11. The communication manager 1532 further includes a second scheduling information component 1542 that may transmit second scheduling information for second resources associated with a second beam that is incompatible with the first beam for full duplex communication including downlink reception and uplink transmission that overlap in time, e.g., as described in connection with 1104 of FIG. 11. The communication manager 1532 further includes a communication adjustment component 1544 that may adjust communication in response to the first beam being incompatible with the second beam for the full duplex communication, e.g., as described in connection with 1106 of FIG. 11.

The apparatus may include additional components that perform each of the blocks of the algorithm in the aforementioned flowcharts of FIGS. 11, 12A-D, and 13A-D. As such, each block in the aforementioned flowcharts of FIGS. 11, 12A-D, and 13A-D may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for transmitting first scheduling information with first resources for periodic transmissions with a first beam based on a half-duplex mode; means for transmitting second scheduling information for second resources associated with a second beam that is incompatible with the first beam for full duplex communication including downlink reception and uplink transmission that overlap in time; and means for adjusting communication in response to the first beam being incompatible with the second beam for the full duplex communication. The aforementioned means may be one or more of the aforementioned components of the apparatus 1502 configured to perform the functions recited by the aforementioned means. As described supra, the apparatus 1502 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Therefore, a UE may perform ongoing periodic uplink or downlink transmissions in a half-duplex mode based on first scheduling information received from the base station. At the same time, the base station may schedule additional transmission in the opposite direction with second scheduling information. The scheduled beams for the transmissions in the two directions, i.e., uplink and downlink, may not be compatible with each other for full duplex communication due to e.g., the inability to cancel or sufficiently mitigate the associated self-interference. Based on aspects described herein, the communication may be adjusted such that the incompatibility of separately scheduled uplink and downlink beams do not impede further communication, and the communication, as modified, may proceed, in either the full duplex mode or the half duplex mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: receiving first scheduling information with first resources for transmissions with a first beam based on a half-duplex mode; receiving second scheduling information for second resources associated with a second beam that is incompatible with the first beam for full duplex communication including downlink reception and uplink transmission that overlap in time; and adjusting communication in response to the first beam being incompatible with the second beam for the full duplex communication.

Aspect 2 is the method of aspect 1, where the first beam is selected based on a first metric for the half-duplex mode and the second beam is selected based on a second metric for a full-duplex mode where the second beam is selected to be paired with a third beam for the full-duplex mode.

Aspect 3 is the method of aspect 2, where the second metric includes a self-interference metric that is not comprised in the first metric.

Aspect 4 is the method of any of aspects 1 to 3, where the second beam is incompatible with the first beam based on self-interference between overlapping full-duplex communication on the first beam and the second beam as a pair for a full-duplex mode.

Aspect 5 is the method of any of aspects 1 to 4, where the first scheduling information is for uplink resources for periodic uplink transmissions with an uplink beam and the second scheduling information is for downlink resources for reception of a downlink transmission with a downlink beam that is incompatible, for the full duplex communication, with the uplink beam.

Aspect 6 is the method of any of aspects 1 to 4, where the first scheduling information is for downlink resources for periodic reception of downlink transmissions with a downlink beam and the second scheduling information is for uplink resources for the uplink transmission with an uplink beam that is incompatible, for the full duplex communication, with the downlink beam.

Aspect 7 is the method of any of aspects 1 to 6, where adjusting the communication comprises resetting the first beam for transmission or reception of the first resources in response to the first beam being incompatible with the second beam for the full duplex communication.

Aspect 8 is the method of aspect 7, further comprising: receiving, in a transmission configuration indicator (TCI) state field in the second scheduling information, an indication of a full duplex beam pair comprising a paired beam that is paired with the second beam; and transmitting or receiving one or more transmission based on the first resources including resetting to use the paired beam indicated in the second scheduling information and not the first beam indicated in the first scheduling information.

Aspect 9 is the method of aspect 7, further comprising: receiving a reference signal configuration for beam failure detection or radio link management that indicates a full duplex paired beam that is paired with the second beam; and transmitting or receiving one or more transmission based on the first resources using the full duplex paired beam and not the first beam indicated in the first scheduling information.

Aspect 10 is the method of aspect 7, further comprising: performing a self-interference measurement (SIM) or a beam management (BM) measurement; determining a paired beam for the full duplex communication with the second beam based on the SIM or the BM measurement; and transmitting or receiving one or more transmission based on the first resources using the paired beam and not the first beam indicated in the first scheduling information.

Aspect 11 is the method of aspect 7, further comprising: identifying a paired beam for the full duplex communication with the second beam based on a downlink synchronization signal block (SSB) that overlaps with random access channel (RACH) occasions in full-duplex mode; and transmitting or receiving one or more transmission based on the first resources using the paired beam and not the first beam indicated in the first scheduling information.

Aspect 12 is the method of any of aspects 1 to 6, where adjusting the communication comprises resetting the second beam for transmission or reception of the second resources.

Aspect 13 is the method of aspect 12, further comprising: receiving, in a transmission configuration indicator (TCI) state field in the first scheduling information, an indication of a full duplex beam pair comprising a paired beam that is paired with the first beam; and transmitting or receiving the communication based on the second scheduling information using the paired beam indicated in the first scheduling information and not the second beam indicated in the second scheduling information.

Aspect 14 is the method of aspect 12, further comprising: receiving a reference signal configuration for beam failure detection or radio link management that indicates a full duplex paired beam that is paired with the first beam; and transmitting or receiving the communication based on the second scheduling information using the full duplex paired beam indicated in the first scheduling information and not the second beam indicated in the second scheduling information.

Aspect 15 is the method of aspect 12, further comprising: performing a self-interference measurement (SIM) or a beam management (BM) measurement; determining a paired beam for the full duplex communication with the first beam based on the SIM or the BM measurement; and transmitting or receiving the communication based on the second scheduling information using the paired beam indicated in the first scheduling information and not the second beam indicated in the second scheduling information.

Aspect 16 is the method of aspect 12, further comprising: identifying a paired beam for the full duplex communication with the first beam based on a downlink synchronization signal block (SSB) that overlaps with random access channel (RACH) occasions in full-duplex mode; and transmitting or receiving the communication based on the second scheduling information using a paired downlink beam indicated in the first scheduling information and not the second beam indicated in the second scheduling information.

Aspect 17 is the method of any of aspects 1 to 6, where adjusting the communication comprises canceling transmission or reception of one or more transmissions based on the first resources in response to the first beam being incompatible with the second beam for the full duplex communication.

Aspect 18 is the method of any of aspects 1 to 6, where adjusting the communication comprises canceling transmission or reception of the second resources in response to the first beam being incompatible with the second beam for the full duplex communication.

Aspect 19 is an apparatus for wireless communication including at least one processor coupled to a memory and configured to implement a method as in any of aspects 1 to 18.

Aspect 20 is an apparatus for wireless communication including means for implementing a method as in any of aspects 1 to 18.

Aspect 21 is a computer-readable medium storing computer executable code, where the code when executed by a processor causes the processor to implement a method as in any of aspects 1 to 18.

Aspect 22 is a method of wireless communication at a base station, comprising: transmitting first scheduling information with first resources for transmissions with a first beam based on a half-duplex mode; transmitting second scheduling information for second resources associated with a second beam that is incompatible with the first beam for full duplex communication including downlink reception and uplink transmission that overlaps in time; and adjusting communication in response to the first beam being incompatible with the second beam for the full duplex communication.

Aspect 23 is the method of aspect 22, where the first beam is selected based on a first metric for the half-duplex mode and the second beam is selected based on a second metric for a full-duplex mode.

Aspect 24 is the method of aspect 23, where the second metric includes a self-interference metric that is not comprised in the first metric.

Aspect 25 is the method of any of aspects 22 to 24, where the second beam is incompatible with the first beam based on self-interference between overlapping full-duplex communication on the first beam and the second beam.

Aspect 26 is the method of any of aspects 22 to 25, where the first scheduling information is for uplink resources for periodic uplink transmissions with an uplink beam and the second scheduling information is for downlink resources for reception of a downlink transmission with a downlink beam that is incompatible, for the full duplex communication, with the uplink beam.

Aspect 27 is the method of any of aspects 22 to 25, where the first scheduling information is for downlink resources for periodic reception of downlink transmissions with a downlink beam and the second scheduling information is for uplink resources for the uplink transmission with an uplink beam that is incompatible, for the full duplex communication, with the downlink beam.

Aspect 28 is the method of any of aspects 22 to 27, where adjusting the communication comprises resetting the first beam for transmission or reception of the first resources in response to the first beam being incompatible with the second beam for the full duplex communication.

Aspect 29 is the method of aspect 28, further comprising: transmitting, in a transmission configuration indicator (TCI) state field in the second scheduling information, an indication of a full duplex beam pair comprising a paired beam that is paired with the second beam; and transmitting or receiving one or more transmission based on the first resources including resetting to use the paired beam indicated in the second scheduling information and not the first beam indicated in the first scheduling information.

Aspect 30 is the method of aspect 28, further comprising: transmitting a reference signal configuration for beam failure detection or radio link management that indicates a full duplex paired beam that is paired with the second beam; and transmitting or receiving one or more transmission based on the first resources using the full duplex paired beam and not the first beam indicated in the first scheduling information.

Aspect 31 is the method of aspect 28, further comprising: receiving an indication of a paired beam for the full duplex communication with the second beam based on a self-interference measurement (SIM) or a beam management (BM) measurement performed at a user equipment (UE); and transmitting or receiving one or more transmission based on the first resources using the paired beam and not the first beam indicated in the first scheduling information.

Aspect 32 is the method of aspect 28, further comprising: receiving an indication of a paired beam for the full duplex communication with the second beam based on a downlink synchronization signal block (SSB) that overlaps with random access channel (RACH) occasions in full-duplex mode; and transmitting or receiving one or more transmission based on the first resources using the paired beam and not the first beam indicated in the first scheduling information.

Aspect 33 is the method of any of aspects 22 to 27, where adjusting the communication comprises resetting the second beam for transmission or reception of the second resources.

Aspect 34 is the method of aspect 33, further comprising: transmitting, in a transmission configuration indicator (TCI) state field in the first scheduling information, an indication of a full duplex beam pair comprising a paired beam that is paired with the first beam; and transmitting or receiving the communication based on the second scheduling information using the paired beam indicated in the first scheduling information and not the second beam indicated in the second scheduling information.

Aspect 35 is the method of aspect 33, further comprising: transmitting a reference signal configuration for beam failure detection or radio link management that indicates a full duplex paired beam that is paired with the first beam; and transmitting or receiving the communication based on the second scheduling information using the full duplex paired beam indicated in the first scheduling information and not the second beam indicated in the second scheduling information.

Aspect 36 is the method of aspect 33, further comprising: receiving an indication of a paired beam for the full duplex communication with the first beam based on a self-interference measurement (SIM) or a beam management (BM) measurement performed at a user equipment (UE); and transmitting or receiving the communication based on the second scheduling information using the paired beam indicated in the first scheduling information and not the second beam indicated in the second scheduling information.

Aspect 37 is the method of aspect 33, further comprising: identifying a paired beam for the full duplex communication with the first beam based on a downlink synchronization signal block (SSB) that overlaps with random access channel (RACH) occasions in full-duplex mode; and transmitting or receiving the communication based on the second scheduling information using a paired downlink beam indicated in the first scheduling information and not the second beam indicated in the second scheduling information.

Aspect 38 is the method of any of aspects 22 to 27, where adjusting the communication comprises canceling transmission or reception of one or more transmissions based on the first resources in response to the first beam being incompatible with the second beam for the full duplex communication.

Aspect 39 is the method of any of aspects 22 to 27, where adjusting the communication comprises canceling transmission or reception of the second resources in response to the first beam being incompatible with the second beam for the full duplex communication.

Aspect 40 is an apparatus for wireless communication including at least one processor coupled to a memory and configured to implement a method as in any of aspects 22 to 39.

Aspect 41 is an apparatus for wireless communication including means for implementing a method as in any of aspects 22 to 39.

Aspect 42 is a computer-readable medium storing computer executable code, where the code when executed by a processor causes the processor to implement a method as in any of aspects 22 to 39.

What is claimed is:

1. A method of wireless communication at a user equipment (UE), comprising:
    receiving first scheduling information with first resources for transmissions with a first beam based on a half-duplex mode;
    receiving second scheduling information for second resources associated with a second beam that is incompatible with the first beam for full duplex communication including downlink reception and uplink transmission that overlap in time;
    identifying a paired beam for the full duplex communication with the second beam based on a downlink synchronization signal block (SSB) that overlaps with random access channel (RACH) occasions in full-duplex mode; and
    transmitting or receiving one or more transmissions based on the first resources using the paired beam and not the first beam indicated in the first scheduling information.

2. The method of claim 1, wherein the first beam is selected based on a first metric for the half-duplex mode and the second beam is selected based on a second metric for a full-duplex mode wherein the second beam is selected to be paired with a third beam for the full-duplex mode.

3. The method of claim 2, wherein the second metric includes a self-interference metric that is not comprised in the first metric.

4. The method of claim 1, wherein the second beam is incompatible with the first beam based on self-interference between overlapping full-duplex communication on the first beam and the second beam as a pair for a full-duplex mode.

5. The method of claim 1, wherein the first scheduling information is for uplink resources for periodic uplink transmissions with an uplink beam and the second scheduling information is for downlink resources for reception of a downlink transmission with a downlink beam that is incompatible, for the full duplex communication, with the uplink beam.

6. The method of claim 1, wherein the first scheduling information is for downlink resources for periodic reception of downlink transmissions with a downlink beam and the second scheduling information is for uplink resources for the uplink transmission with an uplink beam that is incompatible, for the full duplex communication, with the downlink beam.

7. The method of claim 1, further comprising resetting the first beam for transmission or reception of the first resources in response to the first beam being incompatible with the second beam for the full duplex communication.

8. The method of claim 1, further comprising resetting the second beam for transmission or reception of the second resources.

9. The method of claim 1, further comprising canceling transmission or reception of the second resources in response to the first beam being incompatible with the second beam for the full duplex communication.

10. A method of wireless communication at a base station, comprising:
- transmitting first scheduling information with first resources for transmissions with a first beam based on a half-duplex mode;
- transmitting second scheduling information for second resources associated with a second beam that is incompatible with the first beam for full duplex communication including downlink reception and uplink transmission that overlaps in time; and
- in response to the first beam being incompatible with the second beam for the full duplex communication, transmitting or receiving one or more transmissions based on the first resources using a paired beam for the full duplex communication with the second beam based on a downlink synchronization signal block (SSB) that overlaps with random access channel (RACH) occasions in full-duplex mode and not the first beam indicated in the first scheduling information.

11. The method of claim 10, wherein the first beam is selected based on a first metric for the half-duplex mode and the second beam is selected based on a second metric for a full-duplex mode.

12. The method of claim 11, wherein the second metric includes a self-interference metric that is not comprised in the first metric.

13. The method of claim 10, wherein the second beam is incompatible with the first beam based on self-interference between overlapping full-duplex communication on the first beam and the second beam.

14. The method of claim 10, wherein the first scheduling information is for uplink resources for periodic uplink transmissions with an uplink beam and the second scheduling information is for downlink resources for reception of a downlink transmission with a downlink beam that is incompatible, for the full duplex communication, with the uplink beam.

15. The method of claim 10, wherein the first scheduling information is for downlink resources for periodic reception of downlink transmissions with a downlink beam and the second scheduling information is for uplink resources for the uplink transmission with an uplink beam that is incompatible, for the full duplex communication, with the downlink beam.

16. The method of claim 10, further comprising resetting the first beam for transmission or reception of the first resources in response to the first beam being incompatible with the second beam for the full duplex communication.

17. The method of claim 10, further comprising resetting the second beam for transmission or reception of the second resources.

18. The method of claim 10, further comprising canceling transmission or reception of the second resources in response to the first beam being incompatible with the second beam for the full duplex communication.

19. An apparatus for wireless communication at a user equipment (UE), comprising:
- memory; and
- at least one processor coupled to the memory and configured to:
  - receive first scheduling information with first resources for transmissions with a first beam based on a half-duplex mode;
  - receive second scheduling information for second resources associated with a second beam that is incompatible with the first beam for full duplex communication including downlink reception and uplink transmission that overlaps in time;
  - identify a paired beam for the full duplex communication with the second beam based on a downlink synchronization signal block (SSB) that overlaps with random access channel (RACH) occasions in full-duplex mode; and
  - transmit or receive one or more transmissions based on the first resources using the paired beam and not the first beam indicated in the first scheduling information.

20. An apparatus for wireless communication at a base station, comprising:
- memory; and
- at least one processor coupled to the memory and configured to:
  - transmit first scheduling information with first resources for transmissions with a first beam based on a half-duplex mode;
  - transmit second scheduling information for second resources associated with a second beam that is incompatible with the first beam for full duplex communication including downlink reception and uplink transmission that overlaps in time; and
  - in response to the first beam being incompatible with the second beam for the full duplex communication, transmit or receive one or more transmissions based on the first resources using a paired beam for the full duplex communication with the second beam based on a downlink synchronization signal block (SSB) that overlaps with random access channel (RACH) occasions in full-duplex mode and not the first beam indicated in the first scheduling information.

21. The apparatus of claim 19, wherein the first beam is selected based on a first metric for the half-duplex mode and the second beam is selected based on a second metric for a full-duplex mode wherein the second beam is selected to be paired with a third beam for the full-duplex mode.

22. The apparatus of claim 21, wherein the second metric includes a self-interference metric that is not comprised in the first metric.

23. The apparatus of claim 19, wherein the second beam is incompatible with the first beam based on self-interference between overlapping full-duplex communication on the first beam and the second beam as a pair for a full-duplex mode.

24. The apparatus of claim 19, wherein the first scheduling information is for uplink resources for periodic uplink transmissions with an uplink beam and the second scheduling information is for downlink resources for reception of a downlink transmission with a downlink beam that is incompatible, for the full duplex communication, with the uplink beam.

25. The apparatus of claim 19, wherein the first scheduling information is for downlink resources for periodic reception of downlink transmissions with a downlink beam and the second scheduling information is for uplink resources for the uplink transmission with an uplink beam that is incompatible, for the full duplex communication, with the downlink beam.

26. The apparatus of claim 20, wherein the first beam is selected based on a first metric for the half-duplex mode and the second beam is selected based on a second metric for a full-duplex mode wherein the second beam is selected to be paired with a third beam for the full-duplex mode.

27. The apparatus of claim 26, wherein the second metric includes a self-interference metric that is not comprised in the first metric.

28. The apparatus of claim 20, wherein the second beam is incompatible with the first beam based on self-interference between overlapping full-duplex communication on the first beam and the second beam as a pair for a full-duplex mode.

29. The apparatus of claim 20, wherein the first scheduling information is for uplink resources for periodic uplink transmissions with an uplink beam and the second scheduling information is for downlink resources for reception of a downlink transmission with a downlink beam that is incompatible, for the full duplex communication, with the uplink beam.

30. The apparatus of claim 20, wherein the first scheduling information is for downlink resources for periodic reception of downlink transmissions with a downlink beam and the second scheduling information is for uplink resources for the uplink transmission with an uplink beam that is incompatible, for the full duplex communication, with the downlink beam.

* * * * *